United States Patent
LeGrand

(10) Patent No.: US 10,922,820 B2
(45) Date of Patent: Feb. 16, 2021

(54) DATA-DRIVEN DELTA-GENERALIZED LABELED MULTI-BERNOULLI TRACKER

(71) Applicant: National Technology & Engineering Solutions of Sandia, LLC, Albuquerque, NM (US)

(72) Inventor: Keith Allen LeGrand, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 126 days.

(21) Appl. No.: 16/050,992

(22) Filed: Jul. 31, 2018

(65) Prior Publication Data

US 2019/0035088 A1 Jan. 31, 2019

Related U.S. Application Data

(60) Provisional application No. 62/539,268, filed on Jul. 31, 2017.

(51) Int. Cl.
*G06T 7/246* (2017.01)
*G06N 7/00* (2006.01)
*G06T 7/277* (2017.01)

(52) U.S. Cl.
CPC ............ *G06T 7/246* (2017.01); *G06N 7/005* (2013.01); *G06T 7/277* (2017.01); *G06T 2207/10016* (2013.01); *G06T 2207/20024* (2013.01); *G06T 2207/20076* (2013.01)

(58) Field of Classification Search
CPC ............ G06T 7/246; G06T 7/277; G06T 2207/20024; G06T 2207/10016; G06T 2207/20076; G06N 7/005
See application file for complete search history.

(56) References Cited

U.S. PATENT DOCUMENTS

| | | | |
|---|---|---|---|
| 9,291,708 B2* | 3/2016 | Ploplys | G01S 7/295 |
| 2010/0138379 A1* | 6/2010 | Mott | A61B 5/4857 706/52 |
| 2013/0177200 A1* | 7/2013 | Fleuret | G06T 7/20 382/103 |
| 2014/0372073 A1* | 12/2014 | Georgy | G01S 5/0294 702/153 |

(Continued)

OTHER PUBLICATIONS

Branko Ristic, Daniel Clark, Ba-Ngu Vo, "Improved SMC implementation of the PHD filter", 2010 13th International Conference on Information Fusion, Edinburgh, UK.

(Continued)

*Primary Examiner* — Helen Zong
(74) *Attorney, Agent, or Firm* — Yee & Associates, P.C.; Samantha Updegraff

(57) ABSTRACT

A system and method for tracking a plurality of objects. Unlabeled measurement data identifying a plurality of targets corresponding to the plurality of objects is received. A multi-target likelihood function is generated using a persistent target density, a birth target density, and a clutter density. The multi-target likelihood function is used to associate persistent targets with the unlabeled measurement data to update persistent tracks and to initiate a new track for each target in the plurality of targets in the measurement data that is not associated with a persistent target.

20 Claims, 8 Drawing Sheets

(56) References Cited

U.S. PATENT DOCUMENTS

2016/0162738 A1\* 6/2016 Miyano .................. G06T 7/277
348/143

OTHER PUBLICATIONS

Branko Ristic, Ba-Tuong Vo, Ba-Ngu Vo, Alfonso Farina, "A Tutorial on Bernoulli Filters: Theory, Implementation and Applications", IEEE Trans. Signal Processing, vol. 61, No. 13, pp. 3406-3430, 2013.
Shoufeng Lin, Ba Tuong Vo, Sven E. Nordholm, "Measurement Driven Birth Model for the Generalized Labeled Multi-Bernoulli Filter", 2016 International Conference on Control, Automation and Information Sciences (ICCAIS), Ansan, Korea.

\* cited by examiner

DATA-DRIVEN DELTA-GENERALIZED LABELED MULTI-BERNOULLI TRACKER

This application claims the benefit of U.S. Provisional Patent Application Ser. No. 62/539,268, filed Jul. 31, 2017, and entitled "DATA-DRIVEN DELTA-GENERALIZED LABELED MULTI-BERNOULLI TRACKER."

GOVERNMENT LICENSE RIGHTS

This invention was made with Government support under Contract No. DE-NA0003525 awarded by the United States Department of Energy/National Nuclear Security Administration. The U.S. Government has certain rights in this invention.

BACKGROUND INFORMATION

1. Field

The present disclosure relates generally to systems and methods for tracking moving objects. More particularly, illustrative embodiments are directed to identifying new objects for tracking in a multi-target tracking system and method.

2. Background

Multitarget filtering is the process of simultaneously estimating one or more target's kinematic states using noisy, unattributed measurements with the possibility of misdetection and non-target-originated measurements, or clutter. There are, in general, three main approaches to multitarget tracking: joint probabilistic data association (JPDA), MHT, and finite set statistics (FISST).

The FISST approach has received significant attention over the past decade because it enables a top-down Bayesian approach to solving multitarget tracking problems. Central to the FISST approach is the concept of the random finite set (RFS). An RFS is a random-valued set, of which the number of elements is also random. In the FISST framework, RFSs are used to describe the collection of individual target states as well as the collection of unordered measurements at a given time step. By defining a set-valued multitarget state and set-valued multitarget measurement, FISST extends familiar concepts from single-target tracking to the multi-target domain. The resulting FISST toolset, which defines multitarget density and likelihood functions, enables the solving of multitarget tracking problems using similar techniques found in single-target Bayesian estimation.

Two notable filters to emerge from the FISST approach are the probability hypothesis density (PHD) and cardinalized probability hypothesis density (CPHD) filters, which operate on a first-moment approximation of the multitarget density and admit both Gaussian mixture (GM) and sequential Monte Carlo (SMC) implementations. Unlike traditional trackers, which, generally speaking, consist of a data association step followed by a single-target filtering step, the PHD and CPHD filters avoid the data association step altogether by neglecting target identity. For applications where target identity is not important, the reduced computational complexity of unlabeled multitarget filters makes them appealing options over traditional data-association based trackers.

The PHD and CPHD filters maintain no record of track identity and, as a consequence, often suffer from track continuity issues. To alleviate this, labeled extensions were developed for the PHD filter and CPHD filter. These and other works improved track continuity through track labeling techniques. The concept of the labeled RFS was introduced later.

Enabled by labeled RFS theory, the delta-GLMB tracker was introduced as an analytic solution to the Bayes multi-target filter. The delta-GLMB tracker is a significant advancement to multitarget tracking, as it is the first MHT-like tracker that is provably Bayes-optimal. The delta-GLMB tracker is a major departure from its PHD and CPHD predecessors in a number of ways. Firstly, rather than operating on a moment approximation, the delta-GLMB maintains a full multitarget density representation—a complete statistical description from which lower dimensional statistics (such as the PHD) may be computed. Secondly, a unique discrete label state is appended to the individual kinematic target state to facilitate target identification. Data association is required, but its combinatorial output can be controlled through various sampling and truncation techniques. Lastly, target labels in the delta-GLMB filter enable a clear connection between a given target and its spatial uncertainty. This addresses a significant limitation of unlabeled representations, in which the individual contributions of targets the consolidated uncertainty representation (namely, the unlabeled PHD) are often indistinguishable. Isolating an individual target's uncertainty in an unlabeled density is especially challenging or impossible in situations involving closely spaced targets, low measurement signal-to-noise ratio (SNR), or high clutter rates.

An important consideration in operational multi-target tracking is the method by which target appearance, often referred to in tracking literature as target birth, is handled. In traditional tracking algorithms, such as MHT and joint integrated probabilistic data association (JIPDA), new targets are initialized directly from measurement data. In RFS-based filters, however, new targets are modeled by intensity or density functions. Two challenges arise with this approach: determining an appropriate function that accurately describes the birth process and modeling that function in a computationally efficient manner.

Unlabeled birth models commonly used in RFS filters include the Poisson density, the independently and identically distributed (i.i.d.) cluster density, and the multi-Bernoulli (MB) density. The Poisson density is appealing in tracking applications where little information about the birth process is known a priori, as the Poisson density is fully described by its intensity function (PHD). The intensity function describes the spatial distribution of targets, and its integral over the scene volume is equal to the expected number of new targets, which is Poisson-distributed. The i.i.d. cluster density relaxes the Poisson-distributed cardinality assumption and instead uses an arbitrary probability mass function (pmf) to describe target cardinality. This approach is more flexible to incorporating external information about target cardinality, such as soft data from a human operator, on the loop. The MB density is represented in terms of individual (single) target densities and probabilities of existence. Using an MB birth model shifts the focus to individual birth targets, as opposed to the other two aforementioned models, which can be interpreted as more population-centric approaches.

The generalized labeled multi-Bernoulli (GLMB) density is a versatile labeled birth model. Its available level of specificity is rarely needed to describe the limited information known about a birth process a priori. Two special cases of the GLMB density, namely the labeled multi-Bernoulli (LMB) density and labeled Poisson density, require less specificity and simplify the Bayes recursion. The GLMB filter is capable of accepting a GLMB birth density. The LMB density is parameterized by a set of value pairs ($r^{(i)}$; $p^{(i)}$), in which $r^{(i)}$ represents the probability of existence of target i and $p^{(i)}$ is its density. In the context of target birth, representation in this form requires a priori specification of the probability density and probability of existence on an individual target basis. Such specificity is achievable in tracking scenarios with known target birth locations and patterns, such as tracking vehicles emerging from a tunnel during heavy traffic. However, in many tracking scenarios, when far less information is known a priori, the LMB birth model approach may prove cumbersome or intractable.

In most real-world applications, a data-driven approach where new targets are instantiated from measurement data is advantageous, and in many cases, unavoidable. Ideally, to instantiate new targets from measurement data, only detections originating from new targets should be used to instantiate target births. Of course, the challenge is differentiating new target detections from persistent (that is, previously detected) target detections and clutter. Some insight can be gained by looking at the likelihood agreement of measurements to persistent target estimates. Measurements with a strong likelihood agreement to persistent target estimates are less likely to have originated from a new target. Given a single multi-target measurement, new target measurements and clutter are indistinguishable unless their spatial densities are disjoint. To that end, most approaches to the data-driven birth problem rely on deferred decision, that is, delaying the initialization of birth by one or more time steps.

A straightforward solution for adaptively introducing new targets from measurement data in a Bernoulli filter is by sampling the birth distribution at the locations of the measurements at the previous step. Then, intuitively, a new target track is likely to be "confirmed" if another measurement is received close to a measurement at the previous time step, whereas the possibility of subsequent clutter measurements mimicking a new track is less likely. Another solution presents an adaptive birth model for the cardinality-balanced multi-object multi-Bernoulli (CBMeMBer) filter. The received measurements at time k are used to adaptively form the MB density of new births at time k+1. In an effort to minimize the bias introduced by doubly using the measurement data in both the update of persistent targets and formation of the birth density, the birth targets seeded from measurements that have strong likelihood agreement to persistent target estimates are assigned a lower probability of existence. Furthermore, an additional heuristic is introduced that prohibits new targets from being assigned a probability of existence higher than a user-specified maximum value. The same approach may be applied for the GLMB tracker. This approach is simple, effective, and requires minimal implementation modifications. However, this approach violates the fundamental assumption that each target generates observations independent of one another, as a birth target can be initialized from the same measurement used to update a persistent target in the same hypothesis.

Therefore, it would be desirable to have a method and apparatus that take into account at least some of the issues discussed above, as well as other possible issues.

SUMMARY

The illustrative embodiments provide a method of tracking a plurality of objects. Unlabeled measurement data identifying a plurality of targets corresponding to a plurality of objects is received. A multi-target likelihood function is generated using a persistent target density, a birth target density, and a clutter density. The multi-target likelihood function is used to associate persistent targets with the unlabeled measurement data to update persistent tracks and to initiate a new track for each target in the plurality of targets in the measurement data that is not associated with a persistent target.

In another illustrative embodiment, an apparatus comprises a receiver and a data-driven delta-GLMB tracker. The receiver is configured to receive unlabeled measurement data identifying a plurality of targets corresponding to a plurality of objects. The data-driven delta-GLMB tracker is configured to generate a multi-target likelihood function using a persistent target density, a birth target density, and a clutter density. The data-driven delta-GLMB tracker is also configured to use the multi-target likelihood function to associate persistent targets to the unlabeled measurement data to update persistent tracks and to initiate a new track for each target in the plurality of targets in the measurement data that is not associated with a persistent target.

The illustrative embodiments also provide a method of identifying birth targets for tracking a plurality of objects. Measurement data identifying a plurality of targets corresponding to the plurality of objects is received in a first time step. A multi-target likelihood function is generated using a persistent target density for the first time step, a birth target density, and a clutter density. The multi-target likelihood function is used to identify the birth targets for the first time step in the plurality of targets in the received measurement data, wherein the birth targets are new targets that are not associated with already identified persistent targets. A joint posterior density is generated from the persistent target density for the first time step, the birth target density, and the multi-target likelihood function. A time-update is performed on the joint posterior density to generate a predicted density for a second time step. Variables are changed to make the predicted density for the second time step into a persistent target density for the second time step.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Illustrative embodiments described herein address some of the key challenges faced when implementing the GLMB trackers on real-world data. First, a labeled Poisson RFS is used to model target birth, which requires less a priori knowledge and is thus more operator-friendly. Second, to make the birth process data-driven, the GLM tracker is re-derived such that no target may exist without a seed measurement. To achieve this, the case of undetected birth targets is ignored, and the birth process is modeled in the update stage rather than the prediction stage. The resulting filter initializes new targets immediately upon first detection with an appropriate probability of existence without introducing statistical bias or additional heuristics.

Figure 1:
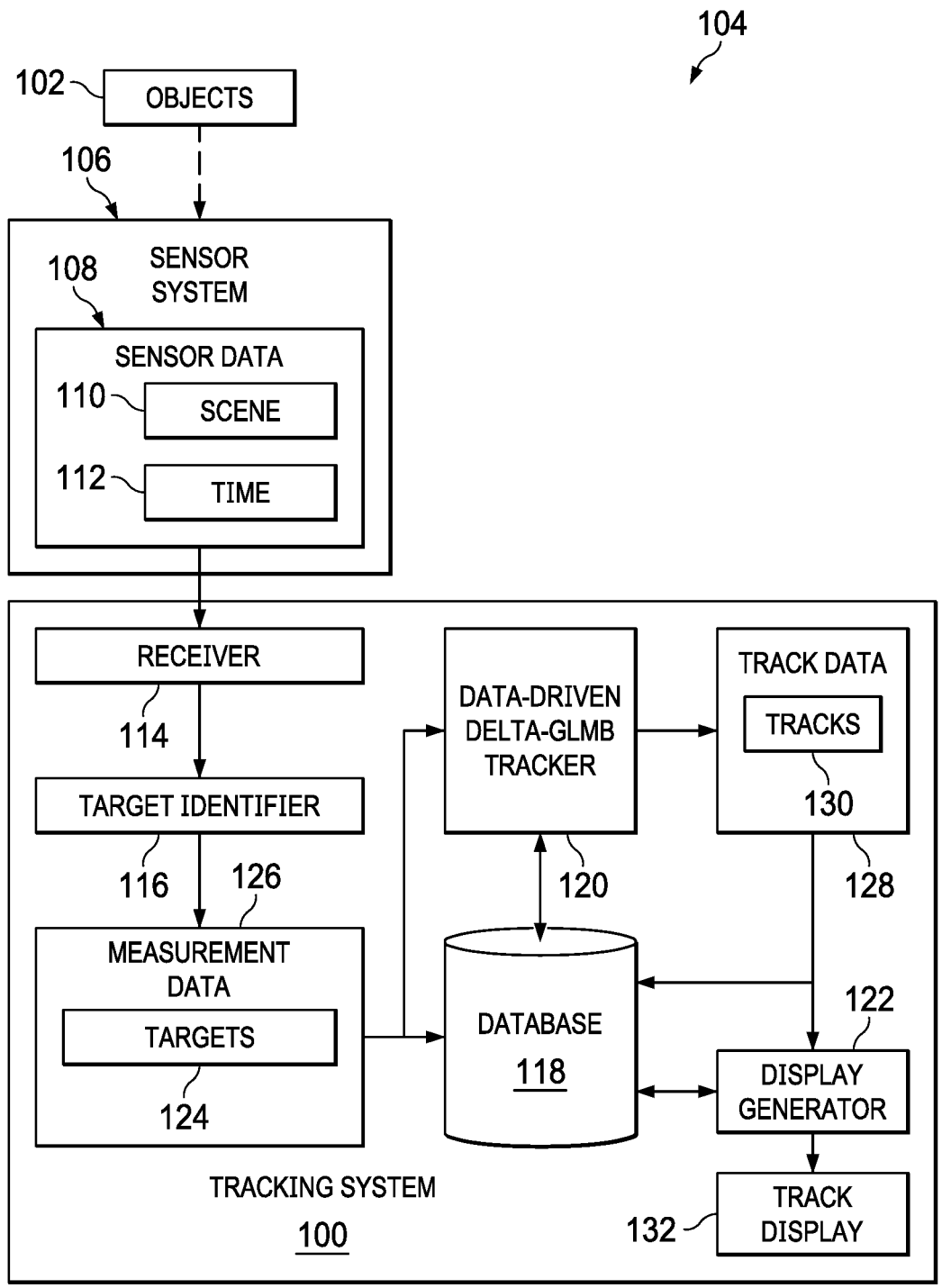
FIG. 1 is an illustration of a block diagram of a tracking system in accordance with an illustrative embodiment.

Turning to FIG. 1, an illustration of a block diagram of a tracking system is depicted in accordance with an illustrative embodiment. Tracking system 100 may be configured to track the movement of a plurality of objects 102 in environment 104. Objects 102 may be any appropriate objects operating in any appropriate environment 104. For example, without limitation, objects 102 may be debris or other objects in space, vehicles, pedestrians, or other objects on the ground, manned or unmanned aircraft in flight, vehicles operating on or under water, or any other appropriate objects or combination of objects operating in any appropriate environment or combination of environments.

The movement of objects 102 in environment 104 may be detected by any appropriate sensor system 106. Sensor system 106 may generate sensor data 108 for a particular scene 110 and time 112. For example, without limitation, sensor system 106 may comprise any appropriate number of cameras operating at any appropriate frequencies. In this case, sensor data 108 may comprise a series of video images of scene 110 over a period of time 112 in which images of objects 102 in environment 104 are captured.

Tracking system 100 may include receiver 114, target identifier 116, database 118, data-driven delta-GLMB tracker 120, and display generator 122. Receiver 114 may be configured to receive sensor data 108 from sensor system 106.

Target identifier 116 may be configured to identify targets 124 in sensor data 108 that correspond to objects 102 in operating environment 104. For example, without limitation, when sensor data 108 is image data, target identifier 116 may comprise image processing to identify the images of objects 102 in sensor data 108 as targets 124. Target identifier 116 may be implemented in any appropriate known manner.

Measurement data 126 comprises the information identifying targets 124 that is obtained from sensor data 108 for a particular scene 110 and time 112. Measurement data 126 may be stored in database 118 for later retrieval and use by data-driven delta-GLMB tracker 120. Alternatively, or in addition, measurement data 126 may be provided directly to data-driven delta-GLMB tracker 120.

Data-driven delta-GLMB tracker 120 is configured to track the movement of objects by tracking targets 124 in measurement data 126 over a period of time. Data-driven delta-GLMB tracker 120 thus may generate track data 128 which includes information describing tracks 130 which indicate the movement of objects 102 over time. Track data 128 may be stored in database 118.

Alternatively, or in addition, track data 128 may be provided directly from data-driven delta-GLMB tracker 120 to display generator 122. Display generator 122 may be configured to generate track display 132. Track display 132 may include any appropriate graphical or other representation of tracks 130 in any appropriate format. Track display 132 may be configured to be presented to a user on any appropriate display device. Track display 132 generated by display generator 122 may be saved in database 118 for retrieval and presentation to a user at a later time.

Figure 2:
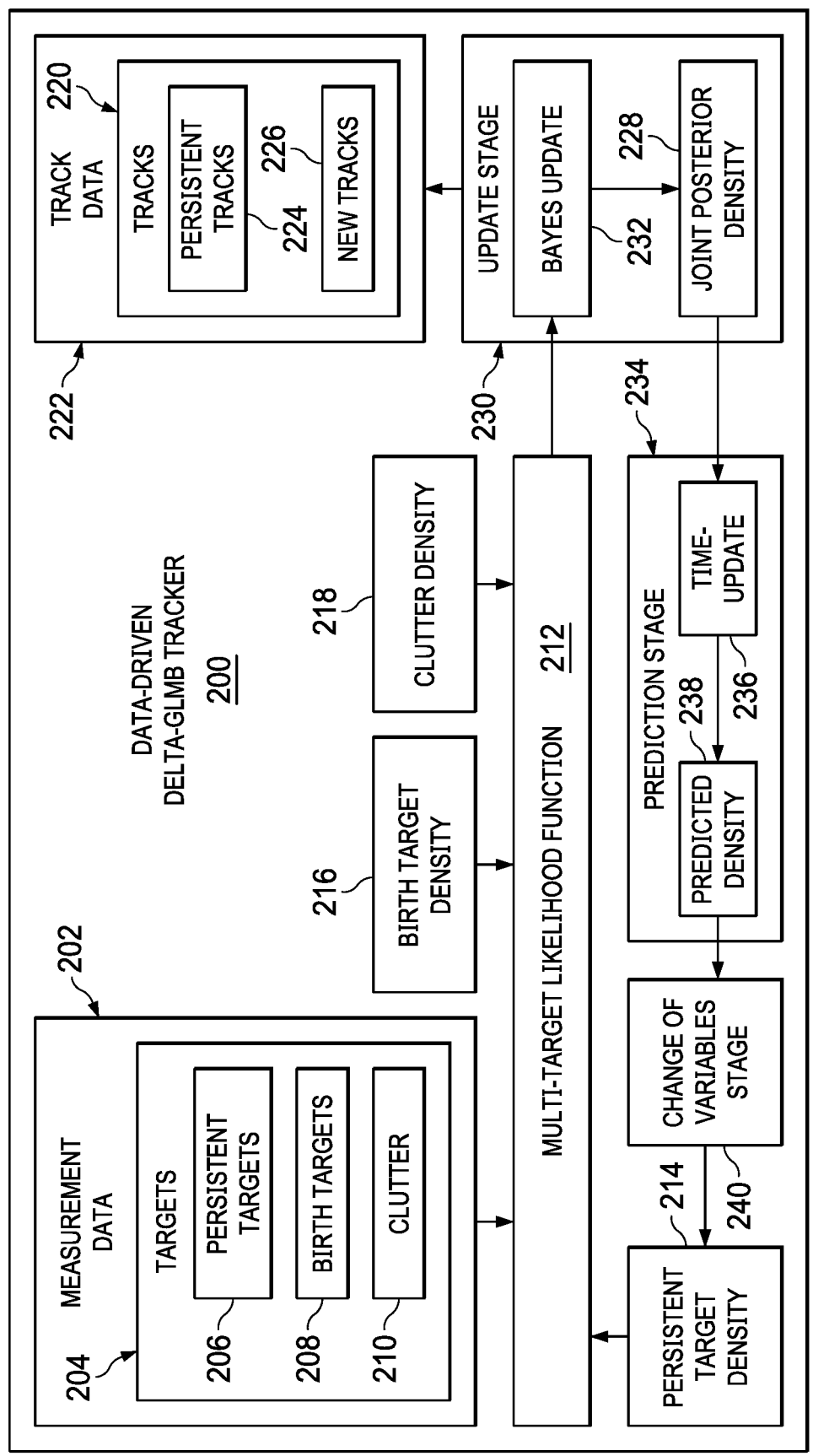
FIG. 2 is a block diagram of a data-driven delta-GLMB tracker in accordance with an illustrative embodiment.

Turning to FIG. 2, a block diagram of a data-driven delta-GLMB tracker is depicted in accordance with an illustrative embodiment. Data-driven delta-GLMB tracker 200 may be an example of one implementation of data-driven delta-GLMB tracker 120 in FIG. 1.

Data-driven delta-GLMB tracker 200 is configured to receive measurement data 202 identifying targets 204. Measurement data 202 and targets 204 may be an example of measurement data 126 and targets 124 in FIG. 1.

Targets 204 in measurement data 202 for any particular time may include one or more of persistent targets 206, birth targets 208, and clutter 210. Persistent targets 206 are targets 204 that represent the latest information for targets that have already been identified and are currently being tracked. Birth targets 208 are targets 204 that do not correspond to targets that have already been identified. Birth targets 208 thus may correspond to new objects appearing in a scene. Clutter 210 may include targets 204 that do not correspond to a real world object. Clutter 210 may include any targets 204 that were wrongly identified as targets in sensor data for any reason.

In accordance with an illustrative embodiment, multi-target likelihood function 212 is used to properly identify persistent targets 206, birth targets 208, and clutter 210 in targets 204 identified in measurement data. For a particular time step, multi-target likelihood function 212 to be applied to measurement data 202 for that time step may be generated from persistent target density 214 for that time step, birth target density 216, and clutter density 218.

Multi-target likelihood function 212 may be used to update or initiate tracks 220 identified in track data 222 using measurement data 202. For example, persistent targets 206 may be identified in targets 204 in measurement data 202 and used to update existing persistent tracks 224 for previously identified targets. Birth targets 208 may be identified in targets 204 in measurement data 202 and used to initiate new tracks 226.

Joint posterior density 228 may e generated in update stage 230. For example, joint posterior density 228 may be related to persistent target density 214 for a time step, multi-target likelihood function 212 for the time step, and birth target density though Bayes update 232.

In prediction stage 234, time-update 236 is applied to joint posterior density 228 to produce predicted density 238 for the next time step. For example, in time-update 236, joint posterior density 228 may be propagated forward in time according to the multi-target Chapman-Kolmogorov equation to produce predicted density 238.

In change of variables stage 236, a change of variables is performed such that predicted density 238 becomes persistent target density 214 for use in the next time step.

The illustrations of tracking system 100 in FIG. 1 and data-driven delta-GLMB tracker 200 in FIG. 2 are not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
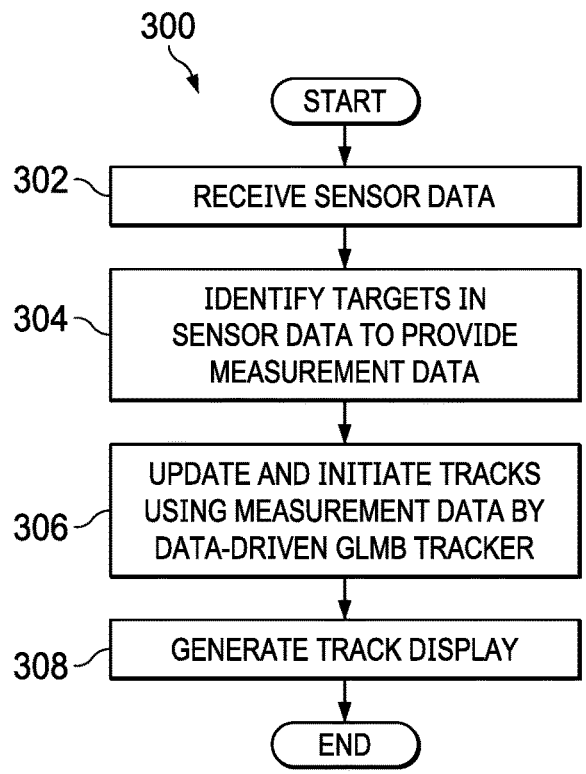
FIG. 3 is an illustration of a flow chart of a process for tracking using a data-driven delta-GLMB tracker in accordance with an illustrative embodiment.

Turning to FIG. 3, an illustration of a flow chart of a process for tracking using a data-driven delta-GLMB tracker is depicted in accordance with an illustrative embodiment. Process 300 may be implemented, for example, in tracking system 100 in FIG. 1.

Process 300 may begin with receiving sensor data (operation 302). The sensor data may include information about a plurality of objects in a scene at particular time. Targets may be identified in the sensor data to provide measurement data (operation 304). The measurement data may be used to update tracks for persistent targets and initiate tracks for birth targets in the measurement data using a data-driven delta-GLMB tracker (operation 306). A track display may then be generated (operation 308) to display the updated and newly identified tracks, with the process terminating thereafter. Process 300 may be repeated at any appropriate interval. For example, without limitation, process 300 may be repeated when new sensor data is received or available.

Figure 4:
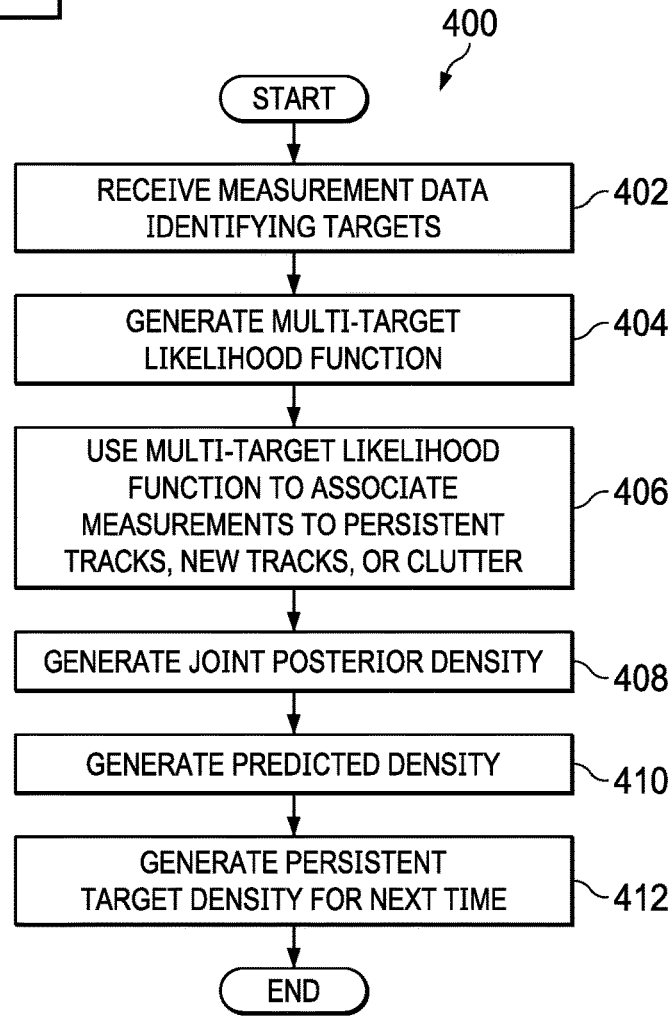
FIG. 4 is an illustration of a flow chart of a process for tracking performed by a data-driven delta-GLMB tracker in accordance with an illustrative embodiment.

Turning to FIG. 4, an illustration of a flow chart of a process for tracking performed by a data-driven delta-GLMB tracker is depicted in accordance with an illustrative embodiment. Process 400 may be implemented, for example, in data-driven delta-GLMB tracker 200 in FIG. 2. Process 400 may be implemented as part of operation 306 in process 300 in FIG. 3.

Process 400 may begin with receiving measurement data identifying targets for a particular time step (operation 402). A multi-target likelihood function may be generated for the time step (operation 404). The multi-target likelihood function may be used to associate the unlabeled measurement data with previously identified persistent targets to update tracks for the persistent targets, to initiate new tracks for birth targets in the measurement data, and to associate the measurement data with clutter as appropriate (operation 406). A joint posterior density may be generated using the multi-target likelihood function (operation 408). A predicted density for the next time step may be generated (operation 410). The predicted density may then become the persistent target density for the next time step by a change of variables (operation 412), with the process terminating thereafter. Process 400 may then be repeated for the next time step.

A more detailed description of example implementations of illustrative embodiments is presented below. Illustrative embodiments are not limited to the particular example implementations described herein.

In the following descriptions, single-target states are represented by lowercase letters (e.g. x,X), while multi-target states are represented by uppercase letters, for example, X,X. Bolded symbols, for example, $\pi$, x,X, are used to distinguish labeled states and functions from unlabeled ones. Spaces are represented by blackboard bold symbols, for example, $\mathbb{X}, \mathbb{Z}, \mathbb{L}$.

The inner product $\int f(x)g(x)dx$ is denoted by $\langle f,g \rangle$ and the multitarget exponential notation defined by $f^A \triangleq \Pi_{a \in A} f(a)$, where $f^\emptyset \triangleq 1$ by definition, is used throughout. The Kronecker delta is generalized to handle vectors and sets as $$\delta_A(B) = \begin{cases} 1, & \text{if } B = A \\ 0, & \text{otherwise} \end{cases}.$$

Similarly, the indictor function is defined as $$1_A(B) = \begin{cases} 1, & \text{if } B \subseteq A \\ 0, & \text{otherwise} \end{cases}.$$

An RFS X on a space $\mathbb{X}$ is a set-valued random variable with realizations in the space of all finite subsets of $\mathbb{X}$, or $\mathcal{F}(\mathbb{X})$. A labeled RFS X is an RFS on $\mathbb{X} \times \mathbb{L}$, where $\mathbb{X}$ is the kinematic space and $\mathbb{L}$ is the discrete label space. The label of a labeled state x is recovered by $\mathcal{L}(x)$, where $\mathcal{L}: \mathbb{X} \times \mathbb{L} \to \mathbb{L}$ is the projection defined by $\mathcal{L}((x,l)) \triangleq l$. Similarly, for labeled RFSs, $\mathcal{L}(X) \triangleq \{\mathcal{L}(x): x \in X\}$. The cardinality of an RFS X is denoted by $|X|$.

A GLMB density can be written as a mixture of multi-target exponentials in the form $$\pi(X) = \Delta(X) \sum_{\xi \in \Xi} w^{(\xi)}(\mathcal{L}(X))[p^{(\xi)}]^X, \quad (1)$$

where each $\xi \in \Xi$ represents a history of measurement association maps, each $p^{(\xi)}(\cdot,l)$ is a probability density on $\mathbb{X}$, and each weight $w^{(\xi)}$ is non-negative with $$\sum_{(I,\xi) \in \mathcal{F}(\mathbb{L}) \times \Xi} w^{(\xi)}(I) = 1.$$

The distinct label indicator $\Delta(X) = \delta_{|X|}(|\mathcal{L}(X)|)$ ensures that only sets with distinct labels are considered. The sum of the weights $$\sum_{(I,\xi) \in \mathcal{F}(\mathbb{L}) \times \Xi} w^{(\xi)}(I) 1_I(\ell)$$

can be interpreted as the probability of existence for track l.

A delta-GLMB density is a special case of the GLMB density, given by $$\pi(X) = \Delta(X) \sum_{(I,\xi) \in \mathcal{F}(\mathbb{L}) \times \Xi} w^{(I,\xi)} \delta_I(\mathcal{L}(X))[p^{(\xi)}]^X,$$

where $$\omega^{(I,\xi)} \triangleq w^{(\xi)}(I)$$

Two important statistics, namely the cardinality distribution and PHD, can be recovered from the delta-GLMB density by $$\rho(n) = \sum_{(I,\xi) \in \mathcal{F}_n(\mathbb{L}) \times \Xi} \omega^{(I,\xi)}$$

$$v(x) = \sum_{(I,\xi) \in \mathcal{F}(\mathbb{L}) \times \Xi} \sum_{\ell \in I} \omega^{(I,\xi)} p^{(\xi)}(x, \ell),$$

where $\mathcal{F}_n(\mathcal{L})$ denotes the class of finite subsets of $\mathcal{L}$ with exactly n elements.

In the data-driven GLMB, the target birth process is modeled as a Poisson RFS, new targets are defined as "born" at their first detection, and the incorporation of birth targets occurs in the measurement update. At a given time k, birth targets are defined as the subset of targets whose first detection occurred at the current time k. Targets are considered "persistent" if their first detection occurred at any time prior to the current time k. Variables and densities corresponding to birth targets and persistent targets are denoted by subscripts "b" and "p," respectively.

For a given persistent multitarget state $X_p$, each single-target element $(x;l) \in X_p$ is either detected with probability $p_d(x,l)$ or misdetected with probability $1-p_D(x,l)$. In accordance with an illustrative embodiment, the birth of a target may be treated as its first detection, such that every element $(x,l)$ of a given birth multitarget state $X_b$ is detected with probability $p_D(x,l)=1$.

A measurement association map $\theta$ is a one-to-one function that uniquely maps persistent target tracks to the incoming measurement set Z. In a given association map, the subset of measurements assigned to persistent targets is denoted by $Z_\theta$. The association map space is the set of all such association maps and is denoted by $\Theta$. Given an association map $\theta$, another level of data association may be performed, mapping birth target tracks to the non-assigned measurements $Z_p = Z - Z_\theta$ via the birth measurement association map $\vartheta$. The birth measurement association map space is the set of all birth measurement association maps and is denoted by V. Both $\theta$ and $\vartheta$ obey the identity that $\theta(i) = \theta(i') > 0$ or $\vartheta(i) = \vartheta(i') > 0$ implies that $i = i'$.

The filter structure of the data-driven GLMB incorporates the birth process in the update stage rather than in the prediction stage. At time k, the density of persistent targets $\pi_p(X_p|Z_{0:k-1}) = \pi_p(X_p)$, where $Z_{0:k-1}$ denotes all received measurements up to and including time k−1, and the density of new targets $\pi_b(X_b)$ undergo a Bayes measurement update to produce the joint posterior density at time k+1, denoted by $\pi(X = X_p \cup X_b|Z_{0:k}) = \pi(X)$. After each update, the persistent target label space $\mathcal{L}$ is redefined to include the birth target label space $\mathbb{B}$ at that update; i.e. $\mathbb{L} \triangleq \mathbb{L} \cup \mathbb{B}$. In the prediction stage, the posterior density $\pi(X)$ undergoes a time-update to produce the prior density $\pi_+(X_+)$. At the next update at time k+1, the birth targets from time k are considered persistent. Thus, a change of variables is performed such that $X_P \leftarrow X_+$ and $\pi_p(X_p) \leftarrow \pi_+(X_+)$.

Measurements are modeled as an RFS consisting of target detections, clutter, and target birth measurements, such that $$Z = Z_p \cup Z_b \cup Z_c, \quad (2)$$

where the "p," "b," and "c" subscripts correspond to persistent targets, birth targets, and clutter, respectively. The false alarm process C is assumed to be Poisson-distributed in time with expected value $\lambda_c$ and distributed in space according to an arbitrary density $K_c(z)/\lambda_c$. The persistent target measurement process $Y(X_p)$, birth measurement process $B(X_b)$, and false alarm process C are statistically independent.

An example of generation of a multi-target likelihood function will now be described in detail. The following is an example of one implementation of operation 404 in FIG. 4 to generate multi-target likelihood function 212 in FIG. 2. Illustrative embodiments are not limited to the particular example presented herein.

The inclusion of birth target measurements in the multi-target measurement process requires the development of a new multitarget likelihood function. Using FISST, the derivation of this new multitarget likelihood function can be performed in a systematic way. For the sake of exposition, the likelihood function is first developed for the unlabeled RFS, and the labeled equivalent is provided for the final form.

The multitarget likelihood function is directly related to the belief-mass function, which is defined as $\beta_\Psi(T) \triangleq \Pr(\Psi \subseteq T)$ for some RFS $\Psi$ and closed-set variable T. For the multitarget measurement RFS (Eq. 2), the belief-mass function is $$\beta_{k+1}(T|X) = \Pr(Y(X_p) \cup C \cup B(X_b) \subseteq T | X)$$
$$= \Pr(Y(X_p) \subseteq T, C \subseteq T, B(X_b) \subseteq T | X)$$
$$= \Pr(Y(X_p) \subseteq T | X) \Pr(C \subseteq T) \Pr(B(X_b) \subseteq T | X)$$
$$= \Pr(Y(X_p) \subseteq T | X_p) \Pr(C \subseteq T) \Pr(B(X_b) \subseteq T | X_b)$$
$$= \beta_{Y(X_p)}(T) \beta_C(T) \beta_{B(X_b)}(T).$$

The general product rule for arbitrary set functions $\phi_1(S), \ldots, \phi_n(S)$ is given as $$\frac{\delta}{\delta Y}(\phi_1(S) \cdots \phi_n(S)) = \sum_{W_1 \uplus \cdots \uplus W_n = Y} \frac{\delta \phi_1}{\delta W_1}(S) \cdots \frac{\delta \phi_n}{\delta W_n}(S),$$

where the summation is taken over all mutually disjoint subsets $W_1, \ldots, W_n$ of Y such that $W_1 \cup \ldots \cup W_n = Y$. Using this rule to take the set derivative of the belief-mass function with respect to Z gives $$\frac{\delta \beta_{k+1}}{\delta Z}(T|Z) = \sum_{Z_p \uplus Z_b \uplus Z_c = Z} \frac{\delta \beta_{Y(X_p)}}{\delta Z_p}(T) \cdot \frac{\delta \beta_C}{\delta Z_c}(T) \cdot \frac{\delta \beta_{B(X_b)}}{\delta Z_b}(T).$$

To relate the belief-mass function to the probability density, the generalized Radon-Nikodym theorem $$f_\Psi(Y) = \frac{\delta \beta_\Psi}{\delta Y}(\emptyset),$$

is used. Setting $T = \emptyset$ gives $$g(Z|X) = \frac{\delta \beta_{k+1}}{\delta Z}(\emptyset | X) = \sum_{Z_p \uplus Z_b \uplus Z_c = Z} f_{Y(X_p)}(Z_p) f_C(Z_c) f_{B(X_b)}(Z_b). \quad (3)$$

Using the known probability density for Poisson-distributed RFSs, the false alarm probability density is $$f_C(Z_c) = e^{\lambda_c}[k_c]^{Z_c}. \quad (4)$$

Assuming that birth targets are detectable with $p_D=1$, then $f_{B(X_b)}(Z_b)=0$ if $|Z_b|=e_b\neq|X_b|$ and otherwise $$f_{B(X_b)}(Z_b) = \sum_{\sigma} g(z_{b,1}|x_{b,\sigma(1)}) \cdots g(z_{b,n}|x_{b,\sigma(e_b)}), \quad (5)$$

where the summation is taken over all permutations $\sigma$ of the numbers $1, \ldots, e_b$. Alternatively, for $|Z_b|=|X_b|$, define a function $\mu:Z_b \to X_b$ by $\mu(z_{b,j})=x_{b,\sigma(j)}$ such that $\mu$ is one-to-one, and any such function $\mu:Z_b \to X_b$ defines a permutation $\sigma$. With this, Equation (5) can be written as $$f_{B(X_b)}(Z_b) = \sum_{\mu:Z_b \to X_b} [g(\cdot|\mu(\cdot))]^{Z_b}. \quad (6)$$

If $Z_p=\{z_{p,1}, \ldots, z_{p,e_p}\}$ with $|Z_p|=e_p$, then $f_{Y(X_p)}=0$ if $e_p>|X_p|$, and otherwise $$f_{Y(X_p)}(Z_p) = f_{Y(X_p)}(\emptyset) \sum_{1\leq i_1\neq\cdots\neq i_{e_p}\leq n} \prod_{j=1}^{e_p} \frac{p_D(x_{i_j})g(z_{p,j}|x_{i_j})}{1-p_D(x_{i_j})}, \quad (7)$$

where $$f_{Y(X_p)}(\emptyset)=[1-p_D]^{X_p}.$$

Equation (7) can be written more conveniently by defining a function $\tau:Z_p \to X_p$ by $\tau(z_{p,j})=x_{i_j}$ for all $j=1, \ldots, e_p$, such that $\tau$ is one-to-one, and any such function $\tau:Z_p \to X_p$ defines an $e_p$-tuple $(i_1, \ldots, i_{e_p})$ with $1\leq i_1\neq\ldots\neq i_{e_p}\leq n$. With this, Equation (7) is rewritten as $$f_{Y(X_p)}(Z_p) = f_{Y(X_p)}(\emptyset) \sum_{\tau:Z_p \to X_p} \left[\frac{p_D(\tau(\cdot))g(\cdot|\tau(\cdot))}{1-p_D(\tau(\cdot))}\right]^{Z_p}. \quad (8)$$

Given the clutter density (Eq. 4), birth target measurement density (Eq. 6), and persistent target measurement density (Eq. 8), the multitarget likelihood of the joint measurement set given the joint multitarget state is $$g(Z|X) = e^{-\lambda_c}[\kappa_c]^Z \sum_{\theta\in\Theta} \sum_{\vartheta\in\hat{V}} \delta_{\theta^{-1}(\{0:|Z|\})}(\mathcal{L}(X_p))\delta_{\theta^{-1}(\{1:|Z_p|\})}(\mathcal{L}(X_b))\times \quad (9)$$

$$\frac{|\mathcal{B}|!}{(|\mathcal{B}|-|\mathcal{L}(X_b)|)!}[\psi_Z(\cdot;\theta)]^{X_p}\left[\frac{g(z_{b,\vartheta(\ell)}|\cdot)}{\kappa_c(z_{b,\vartheta(\ell)})}\right]^{X_b}.$$

where $$\psi_Z(x,\ell;\theta) = \delta_0(\theta(\ell))(1-p_D(x,\ell)) + (1-\delta_0(\theta(\ell)))\frac{p_D(x,\ell)g(z_{\theta(\ell)}|x,\ell)}{\kappa_c(z_{\theta(\ell)})}.$$

Substituting Equations (4), (6), and (8) into Equation (3) gives $$g(Z|X) = \sum_{Z_p\uplus Z_b\uplus Z_c=Z} f_{Y(X_p)}(Z_p)f_O(Z_c)f_{B(X_b)}(Z_b) \quad (10)$$

$$= e^{-\lambda_c}f_{Y(X_p)}(\emptyset) \sum_{Z_p\uplus Z_b\uplus Z_c=Z} [\kappa_c]^{Z_c} \sum_{\tau:Z_p\to X_p}$$

$$\left[\frac{p_D(\tau(\cdot))g(\cdot|\tau(\cdot))}{1-p_D(\tau(\cdot))}\right]^{Z_p} \sum_{\mu:Z_b\to X_b} [g(\cdot|\mu(\cdot))]^{Z_b}.$$

Using the algebraic relationship $$f^{Z_c} = \frac{f^Z}{f^{Z-Z_c}} = \frac{f^Z}{f^{Z_p}f^{Z_b}},$$

two of the products of Equation (10) can be combined to give $$g(Z|X) = e^{-\lambda_c}[\kappa_c]^Z f_{Y(X_p)}(\emptyset)$$

$$\sum_{Z_p\uplus Z_b\uplus Z_c=Z} \sum_{\tau:Z_p\to X_p} \sum_{\mu:Z_b\to X_b} \left[\frac{p_D(\tau(\cdot))g(\cdot|\tau(\cdot))}{(1-p_D(\tau(\cdot)))\kappa_c(\cdot)}\right]^{Z_p}\left[\frac{g(\cdot|\mu(\cdot))}{\kappa_c(\cdot)}\right]^{Z_b}.$$

Let $Z_{\bar{p}}=Z-Z_p=Z_c\uplus Z_b$, and split the first sum so that $$g(Z|X) = e^{-\lambda_c}[\kappa_c]^Z f_{Y(X_p)}(\emptyset) \sum_{Z_p\uplus Z_{\bar{p}}=Z} \sum_{\tau:Z_p\to X_p} \left[\frac{p_D(\tau(\cdot))g(\cdot|\tau(\cdot))}{(1-p_D(\tau(\cdot)))\kappa_c(\cdot)}\right]^{Z_p}$$

$$\sum_{Z_c\uplus Z_b=Z_{\bar{p}}} \sum_{\mu:Z_b\to X_b} \left[\frac{g(\cdot|\mu(\cdot))}{\kappa_c(\cdot)}\right]^{Z_b}.$$

Note that, in order to facilitate multiplication with priors of the form of Equation (1), it is desirable to express the product terms over the multitarget state rather than the multitarget measurement. To that end, let $Z\cup\{\phi\}$ be the augmented observation set obtained by appending a dummy variable $\phi$, which represents misdetection, to $Z$. Then, each choice of $Z_p \uplus Z_{\bar{p}}=Z$ and each choice of one-to-one mapping function $\tau:Z_p \to X_p$ determines a function $\gamma_{Z_{p,\tau}}:X_p\to Z\cup\{\phi\}$ defined by $\gamma_{Z_{p,\tau}}(x)=z$ if there is a $z$ with $\tau(z)=x$, and $\gamma_{Z_{p,\tau}}(x)=\phi$ otherwise. With this, the first two sums can be combined into one sum over $\gamma_{Z_{p,\tau}}$; that is, $$g(Z|X) = e^{-\lambda_c}[\kappa_c]^Z f_{Y(X_p)}(\emptyset) \sum_{\gamma:X_b\to Z\cup\{\phi\}} \left[\frac{p_D(\cdot)g(\gamma(\cdot)|\cdot)}{(1-p_D(\cdot))\kappa_c(\gamma(\cdot))}\right]^{\{x:\gamma(x)\neq\phi\}}$$

$$\sum_{Z_c\uplus Z_b=Z-\gamma(X_p)} \sum_{\mu:Z_b\to X_b} \left[\frac{g(\cdot|\mu(\cdot))}{\kappa_c(\cdot)}\right]^{Z_b}.$$

where $\gamma(x)=\gamma_{Z_{p,\tau}}$ and $\gamma(X_p)=\{\gamma(x_{p,1}, \ldots, x_{p,n})\}$ are used for readability.

Furthermore, for each choice of $Z_c \cup Z_b = Z - \gamma(X_p)$ and each choice of function $\mu: Z_b \to X_b$, define the function $\varkappa_{Z_{b,\mu}}: X_b \to Z - \gamma(X_p)$ by $\varkappa_{Z_{b,\mu}}(x_b) = z_b$ if there is a $z_b$ with $\mu(z_b) = x_b$. Note that because $\mu$ is restricted to $|Z_b| = |X_b|$, $\varkappa_{Z_{b,\mu}}$ is undefined over the domain $|X_b| > |Z - \gamma(X_p)|$. With this, the last two sums can be combined, and $$g(Z|X) = e^{-\lambda_c}[\kappa_c]^Z f_{Y(X_p)}(\emptyset) \sum_{\gamma: X_b \to Z \cup \{\emptyset\}} \left[\frac{p_D(\cdot)g(\gamma(\cdot)|\cdot)}{(1-p_D(\cdot))\kappa_c(\gamma(\cdot))}\right]^{\{x: \gamma(x) \neq \emptyset\}} \quad (11)$$
$$\sum_{x: X_b \to Z - \gamma(X_p)} \left[\frac{g(x(\cdot)|\cdot)}{\kappa_c(x(\cdot))}\right]^{X_b}.$$

Finally, Equation (11) can be expressed in a more tangible form in terms of target-to-measurement associations defined mathematically as a function $$\theta: \{1, \ldots, |X_p|\} \to \{0, 1, \ldots, |Z|\},$$

where $\theta(i) = 0$ represents a missed detection. For every $i = 1, \ldots, |X_p|$, if $\theta(i) > 0$, then the observation $z_{\theta(i)}$ is uniquely associated with the track $x_i$, but if $\theta(i) = 0$, then no observation is associated with $x_i$ (the target $x_i$ was not detected). With this, Equation (11) is rewritten as $$g(Z|X) = e^{-\lambda_c}[\kappa_c]^Z f_{Y(X_p)}(\emptyset) \quad (12)$$
$$\sum_\theta \left[\frac{p_D(x_i)g(z_{\theta(\cdot)}|x_b)}{(1-p_D(x_i))\kappa_c(z_{\theta(\cdot)})}\right]^{\{i: \theta(i) > 0\}} \sum_{x: X_b \to Z - Z_c} \left[\frac{g(x(\cdot)|\cdot)}{\kappa_c(x(\cdot))}\right]^{X_b},$$

where the first sum is taken over all valid target-to-measurement associations, and $Z_\theta = \{z_{\theta(i)}: \theta(i) > 0\}$. Noting that the set of measurements not assigned to persistent targets $Z_{\bar{p}} = Z - Z_\theta$, define a birth measurement association function $\vartheta: \{1, \ldots, |X_b|\} \to \{1, \ldots, |Z_{\bar{p}}|\}$ that has the property $\vartheta(j) = \vartheta(j')$ implies $j = j'$. In other words, a birth target is assigned one and only one measurement. With this, Equation (12) can be written as $$g(Z|X) = e^{-\lambda_c}[\kappa_c]^Z f_{Y(X_p)}(\emptyset) \quad (13)$$
$$\sum_\theta \left[\frac{p_D(x_i)g(z_{\theta(\cdot)}|x_i)}{(1-p_D(x_i))\kappa_c(z_{\theta(\cdot)})}\right]^{\{i: \theta(i) > 0\}} \sum_\vartheta \left[\frac{g(z_{\bar{p},\vartheta(\cdot)}|x_{b,j})}{\kappa_c(z_{\bar{p},\vartheta(\cdot)})}\right]^{\{j: 1 \leq j \leq |X_b|\}}.$$

The labeled equivalent of Equation (13) is $$g(Z|X) = e^{-\lambda_c}[\kappa_c]^Z f_{Y(X)}(\emptyset) \quad (14)$$
$$\sum_{\theta \in \Theta} \sum_{\vartheta \in V} \delta_{\theta^{-1}(\{0:|Z|\})}(\mathcal{L}(X_p)) \delta_{\vartheta^{-1}(\{1:|Z_{\bar{p}}|\})}(\mathcal{L}(X_b)) \times$$
$$\left[\frac{p_D(\cdot)g(z_{\theta(\ell)}|\cdot)}{(1-p_D(\cdot))\kappa_c(z_{\theta(\ell)})}\right]^{X_p} \left[\frac{g(z_{\bar{p},\vartheta(\ell)}|\cdot)}{\kappa_c(z_{\bar{p},\vartheta(\ell)})}\right]^{X_b},$$

where the new persistent target measurement association map $\theta$ is defined over the label space $\mathbb{L}$ rather than over $\{1, \ldots, |X_p|\}$ and $\Theta$ is the space of mappings $\theta: \mathbb{L} \to \{0:|Z|\}$). Similarly, the birth target measurement association $\vartheta$ is defined over the birth label space $\mathbb{B}$ rather than over $\{1, \ldots, |X_b|\}$, and V is the space of mappings $\vartheta: \mathbb{B} \to \{1:|Z_{\bar{p}}|\}$. Note that, while not explicitly denoted, the space V is a function of $\theta$. Also note that a given $\vartheta$ need not span the entire birth target label space $\mathbb{B}$; in fact, $\vartheta(l \in \mathbb{B})$ undefined implies birth target l does not exist in the given hypothesis. The term $\delta_{\theta^{-1}(\{0:|Z|\})}(\mathcal{L}(X_p))$, which is equal to 1 when the part of the domain of $\theta$ that maps to $\{0:|Z|\} \triangleq \{0, 1, \ldots, |Z|\}$ matches the labels of $X_p$, and 0 otherwise, restricts the summation to valid association maps in $\Theta$. The term $\delta_{\vartheta^{-1}(\{0:|Z_{\bar{p}}|\})}(\mathcal{L}(X_b))$, where $\{1:0\} = \emptyset$ by convention, restricts the summation to valid birth target association maps.

In practicality, the full birth target measurement association space V need not be considered, as the inclusion of multiple nearly-identical assignments in which only the birth target label order differs is unnecessary. For example, there is no apparent value in considering two identical birth target initializations, wherein one, the targets are labeled as "1," "2," and "3," and in the other "2," "1," and "4." To address this, define a single unique birth label assignment function $F: \mathbb{B} \to \{1:|Z|\}$ that obeys the identity: $F(i) = F(i')$ implies that $i = i'$. With this, a reduced birth target measurement association space $\hat{V} \subseteq V$ can be defined as the set of all $\vartheta^{(i)}$ that satisfy $z_{\bar{p},\vartheta^{(i)}(l)} = z_{F(l)}$. Using the reduced space $\hat{V}$ ensures that a measurement is associated with at most one unique birth label across all hypotheses. Equation (14) can be written in terms of $\hat{V}$ as $$g(Z|X) = e^{-\lambda_c}[\kappa_c]^Z \sum_{\theta \in \Theta} \sum_{\vartheta \in \hat{V}} \delta_{\theta^{-1}(\{0:|Z|\})}(\mathcal{L}(X_p)) \delta_{\vartheta^{-1}(\{1:|Z_{\bar{p}}|\})}(\mathcal{L}(X_b)) \times$$
$$\frac{|\mathbb{B}|!}{(|\mathbb{B}| - |\mathcal{L}(X_b)|)!} [\psi_Z(\cdot; \theta)]^{X_p} \left[\frac{g(z_{\bar{p},\vartheta(\ell)}|\cdot)}{\kappa_c(z_{\bar{p},\vartheta(\ell)})}\right]^{X_b},$$

where $$\psi_Z(x, \ell; \theta) = \delta_0(\theta(\ell))(1 - p_D(x, \ell)) + (1 - \delta_0(\theta(\ell)))\frac{p_D(x, \ell)g(z_{\theta(\ell)}|x, \ell)}{\kappa_c(z_{\theta(\ell)})}.$$

A simple example is presented. The persistent target label space at a given time step is $\mathbb{Z} = \{1, 2, 3\}$. Five measurements are received, and the birth target label space is defined as $\mathbb{B} = \{4, 5, 6, 7, 8\}$. This selection ensures that $\mathbb{Z} \cap \mathbb{B} = \emptyset$ and allows for the possibility that all five measurements are due to new targets. To ensure that these labels are associated with the same measurements across all hypotheses, the unique birth label assignment function $F: \mathbb{B} \to \{1:|Z|\}$ is defined as follows: $F(4) = 1$, $F(5) = 2$, $F(6) = 3$, $F(7) = 4$, and $F(8) = 5$. Table 1 shows all of the equivalent measurements using different index functions for a given valid selection of $\theta: \mathbb{Z} \to \{0:|Z|\}$ and $\vartheta$. The persistent target measurement association map shown is given by $\theta(1) = 2$, $\theta(2) = 0$ (indicating a missed detection for $l = 2$), and $\theta(3) = 4$. Given this selection of $\theta$, the birth target association map is defined as $\vartheta(4) = 1$, $\vartheta(8) = 3$, and undefined over the rest of $\mathbb{B}$.

TABLE 1

Measurement equivalence for example target/measurement association maps $\theta$ and v.

| $\mathbb{B}$ | 4 | 5 | 6 | 7 | 8 |
|---|---|---|---|---|---|
| Z | $z_1$ | $z_2$ | $z_3$ | $z_4$ | $z_5$ |
| $Z_{F(\mathbb{B})}$ | $z_{F(4)}$ | $z_{F(5)}$ | $z_{F(6)}$ | $z_{F(7)}$ | $z_{F(8)}$ |
| $Z_\theta$ | | $z_{\theta(1)}$ | | $z_{\theta(3)}$ | |
| $Z_{\bar{p}} = Z - Z_\theta$ | $z_{\bar{p},1}$ | | $z_{\bar{p},2}$ | | $z_{\bar{p},3}$ |
| $Z_b$ | $z_{b,1}$ | | | | $z_{b,2}$ |

The joint posterior density is related to the persistent target prior, birth target prior, and multitarget likelihood function through the Bayes update $$\pi(X|Z) = \frac{g(Z|X)\pi_p(X_p)\pi_b(X_b)}{\int g(Z|X)\pi_p(X_p)\pi_b(X_b)\delta X}.$$

The prior persistent target density is a delta-GLMB distribution of the form $$\pi_p(X_p) = \Delta(X_p)\sum_{\xi\in\Xi} w^{(\xi)}(\mathcal{L}(X_p))[p^{(\xi)}]^{X_p}, \quad (15)$$

where $\Delta(X_p)$ is the distinct label indicator $\delta_{|X_p|}(|\mathcal{L}(X_p)|)$. The prior birth target density is assumed to be Poisson, given by $$\pi_b(X_b) = \Delta(X_b)w_b(\mathcal{L}(X_b))[p_b]^{X_b}, \quad (16)$$

where $$p_b(x,\ell) = v_b(x)/\langle v_b, 1\rangle,$$

$$w_b(B) = 1_{\mathbb{B}}(B)Pois_{\langle v_b,1\rangle}(|B|)\frac{(|\mathbb{B}|-|B|)!}{|\mathbb{B}|!},$$

$$Pois_\lambda(n) \triangleq e^{-\lambda}\lambda^n/n!,$$

and $v_b(x)$ is the PHD of birth targets. The Poisson density is a natural choice for modeling target birth when little information is known a priori. In operational tracking, specification of every possible birth target's probability of existence is non-intuitive if no other information is available. A "best guess" of the rate that new targets appear is typically less restrictive and is sufficient to fully describe the Poisson cardinality distribution.

Given the persistent multitarget prior (Eq. 15), birth multitarget prior (Eq. 16), and likelihood function (Eq. 9), the joint multitarget posterior density is given by $$\pi(X|Z) = \Delta(X_p)\Delta(X_b)\sum_{\xi\in\Xi}\sum_{\theta\in\Theta}\sum_{\hat{v}\in\hat{V}} w_Z^{(\xi,\theta,v)}(\mathcal{L}(X))[p^{(\xi,\theta,v)}(\cdot|Z)]^X,$$

where and $$p^{(\xi,\theta,v)}(x,\ell|Z) \triangleq 1_{\mathcal{L}}(\ell)p^{(\xi,\theta)}(x,\ell|Z) + (1-1_{\mathcal{L}}(\ell))p_b^{(\vartheta)}(x,\ell|Z),$$

$$p^{(\xi,\theta)}(x,\ell|Z) \triangleq \frac{p^{(\xi)}(x,\ell)\tilde{w}_Z(x,\ell;\theta)}{\eta_Z^{(\xi,\theta)}(\ell)}, \quad (17)$$

$$\eta_Z^{(\xi,\theta)}(\ell) = \langle p^{(\xi)}(\cdot,\ell), \psi_Z(\cdot,\ell;\theta)\rangle,$$

$$p_b^{(\vartheta)}(x,\ell|Z) \triangleq \frac{g(z_{p,\vartheta(\ell)}|x)p_b(x)}{\langle g(z_{p,\vartheta(\ell)}|\cdot), p_b(\cdot)\rangle}, \quad (18)$$

$$p_b(z) \triangleq \langle g(z|\cdot), p_b(\cdot)\rangle.$$

Multiplication of the multitarget priors (Eqs. 15 and 16) and the likelihood function (Eq. 9) gives $$g(Z|X)\pi_p(X_p)\pi_b(X_b) = \Delta(X_p)\Delta(X_b)e^{-\lambda_c}\kappa_c^Z$$

$$\sum_{\xi\in\Xi}\sum_{\theta\in\Theta}\sum_{\hat{v}\in\hat{V}} \delta_{\theta^{-1}(\{0:|Z|\})}(\mathcal{L}(X_p))\delta_{\theta^{-1}(\{1:|Z_p|\})}(\mathcal{L}(X_b)) \times w^{(\xi)}(\mathcal{L}(X_p))$$

$$\tilde{w}_b(\mathcal{L}(X_b))[p^{(\xi)}(\cdot)\psi_Z(\cdot,\theta)]^{X_p}\left[\frac{g(z_{p,\vartheta(\ell)}|\cdot)p_b(\cdot)}{\kappa_c(z_{p,\vartheta(\ell)})}\right]^{X_b},$$

where $$\tilde{w}_b(B) \triangleq w_b(B)\frac{|\mathbb{B}|!}{(|\mathbb{B}|-|B|)!} = 1_{\mathbb{B}}(B)Pois_{\langle v_b,1\rangle}(|B|).$$

Substituting Equation (17) gives $$g(Z|X)\pi_p(X_p)\pi_b(X_b) = \Delta(X_p)\Delta(X_b)e^{-\lambda_c}\kappa_c^Z \quad (19)$$

$$\sum_{\xi\in\Xi}\sum_{\theta\in\Theta}\sum_{\hat{v}\in\hat{V}} \delta_{\theta^{-1}(\{0:|Z|\})}(\mathcal{L}(X_p))\delta_{\theta^{-1}(\{1:|Z_p|\})}(\mathcal{L}(X_b)) \times w^{(\xi)}(\mathcal{L}(X_p))\tilde{w}_b(\mathcal{L}(X_b))[\eta_Z^{(\xi,\theta)}]^{\mathcal{L}(X_p)}[p^{(\xi,\theta)}(\cdot|Z)]^{X_p}\left[\frac{g(z_{p,\vartheta(\ell)}|\cdot)p_b(\cdot)}{\kappa_c(z_{p,\vartheta(\ell)})}\right]^{X_b}.$$

Now, consider the integral $$\int g(Z|X)\pi_p(X_p)\pi_b(X_b)\delta X = e^{-\lambda_c}\kappa_c^Z\int \Delta(X_p)\Delta(X_b)\sum_{\xi\in\Xi}\sum_{\theta\in\Theta}\sum_{\hat{v}\in\hat{V}} \quad (20)$$

$$\delta_{\theta^{-1}(\{0:|Z|\})}(\mathcal{L}(X_p))\delta_{\theta^{-1}(\{1:|Z_p|\})}$$

where $$w_Z^{(\xi,\theta,v)}(L) \triangleq \frac{\delta_{\theta^{-1}(\{0:|Z|\})}(L\cap\mathbb{L})\delta_{\theta^{-1}(\{1:|Z_p|\})}(L-\mathbb{L})w^{(\xi)}(L\cap\mathbb{L})\tilde{w}_b(L-\mathbb{L})[\eta_Z^{(\xi,\theta)}]^{L\cap\mathbb{L}}\left[\frac{p_b(z_{p,\vartheta(\cdot)})}{\kappa_c(z_{p,\vartheta(g)})}\right]^{L-\mathbb{L}}}{\sum_{\xi\in\Xi}\sum_{\theta\in\Theta}\sum_{\hat{v}\in\hat{V}}\sum_{J\in(\mathbb{L})}\sum_{B\in\mathcal{F}(B)}\delta_{\theta^{-1}(\{0:|Z|\})}(J)\delta_{\theta^{-1}(\{1:|Z_p|\})}(B)\tilde{w}_b(B)w^{(\xi)}(J)[\eta_Z^{(\xi,\theta)}]^J\left[\frac{p_b(z_{p,\vartheta(\cdot)})}{\kappa_c(z_{p,v(\cdot)})}\right]^B},$$

-continued $$(\mathcal{L}(X_b)) \times$$

$$w^{(\xi)}(\mathcal{L}(X_p))\tilde{w}_b(\mathcal{L}(X_b))[\eta_Z^{(\xi,\theta)}]^{\mathcal{L}(X_p)}$$

$$[p^{(\xi,\theta)}(\cdot|Z)]^{X_p}$$

$$\left[\frac{g(v_{p,\vartheta(\ell)}|\cdot)p_b(\cdot)}{\kappa_c(z_{\overline{p},\vartheta(\ell)})}\right]^{X_b}\delta X$$

$$= e^{-\lambda_c}\kappa_c^Z \sum_{\xi \in \Xi}\sum_{\theta \in \Theta}\sum_{\vartheta \in \hat{V}}\int \Delta(X_p)\delta_{\theta^{-1}(\{0:|Z|\})}$$

$$(\mathcal{L}(X_p))x^{(\xi)}(\mathcal{L}(X_p))[\eta_p^{(\xi,\theta)}]^{\mathcal{L}(X_p)}$$

$$[p^{(\xi,\theta)}(\cdot|Z|)]^{X_p}\delta X_p \times$$

$$g(Z|X)\pi_p(X_p)\pi_b(X_b) = \Delta(X_p)\Delta(X_b)e^{-\lambda_c}\kappa_c^Z \qquad (23)$$

$$\sum_{\xi \in \Xi}\sum_{\theta \in \Theta}\sum_{\vartheta \in \hat{V}}\delta_{\theta^{-1}(\{0:|Z|\})}(\mathcal{L}(X_p))\delta_{\theta^{-1}(\{1:|Z_p|\})}(\mathcal{L}(X_b))\times w^{(\xi)}(\mathcal{L}(X_p))\tilde{w}_b(\mathcal{L}(X_b))[\eta_Z^{(\xi,\theta)}]^{\mathcal{L}(X_p)}[p^{(\xi,\theta)}(\cdot|Z)]^{X_p}\left[\frac{p_b(z_{\overline{p},\vartheta(\ell)})p_b^{(\vartheta)}(\cdot|Z)}{\kappa_c(z_{\overline{p},\vartheta(\ell)})}\right]^{X_b}.$$

-continued $$\int \Delta(X_b)\delta_{\theta^{-1}(\{1:|Z_p|\})}$$

$$(\mathcal{L}(X_b))\tilde{w}_b(\mathcal{L}(X_b))$$

$$\left[\frac{g(z_{\overline{p},\vartheta(\ell)}|\cdot)p_b(\cdot)}{\kappa_c(z_{\overline{p},\vartheta(\ell)})}\right]^{X_b}\delta X_b.$$

Let $\Delta(X)$ denote the distinct label indicator $\delta_{(|X|)}(|\mathcal{L}(X)|)$. Then for h: $\mathcal{F}(\mathbb{X}) \to \mathbb{L}$ and g: $\mathbb{X} \times \mathbb{Z} \to \mathbb{L}$, integrable on $\mathbb{X}$, $$\int \Delta(X)h(\mathcal{L}(X))g^X\delta X = \sum_{L \subseteq \mathbb{L}}h(L)\left[\int g(x,\cdot)dx\right]^L.$$

Applying this to the integral over $X_p$ and the integral over $X_b$ in Equation (20) gives $$\int g(Z|X)\pi_p(X_p)\pi_b(X_b)\delta X =$$

$$e^{-\lambda_c}\kappa_c^Z\sum_{\xi \in \Xi}\sum_{\theta \in \Theta}\sum_{\vartheta \in \hat{V}}\sum_{J \in \mathcal{F}(\mathbb{L})}\sum_{B \in \mathcal{F}(\mathbb{B})}\delta_{\theta^{-1}(\{0:|Z|\})}(J)\delta_{\theta^{-1}(\{1:|Z_p|\})}(B)\times$$

$$\hat{w}_b(B)w^{(\xi)}(J)[\eta_Z^{(\xi,\theta)}]^J\left[\int\frac{g(z_{\overline{p},\vartheta(\cdot)}|x,\cdot)p_b(x,\cdot)}{\kappa_c(z_{\overline{p},\vartheta(\cdot)})}dx\right]^B.$$

Define the marginal birth density over the measurement space as $$P_b(z,l) \triangleq \langle g(z|\cdot,l)p_b(\cdot,l)\rangle. \qquad (21)$$

If the individual birth measurement likelihood is independent of target label ($g(z_{p,\vartheta(\cdot)}|x,l)=g(z_{p,\vartheta(\cdot)}|x)$) and the individual target birth density is independent of target label ($p_b(x,l)=p_b(x)$, which is true under the Poisson birth assumption), then $p_b(z,l)=p_b(z)$. With this, $$\int g(Z|X)\pi_p(X_p)\pi_b(X_b)\delta X = \qquad (22)$$

-continued $$e^{-\lambda_c}\kappa_c^Z\sum_{\xi \in \Xi}\sum_{\theta \in \Theta}\sum_{\vartheta \in \hat{V}}\sum_{J \in \mathcal{F}(\mathbb{L})}\sum_{B \in \mathcal{F}(\mathbb{B})}\delta_{\theta^{-1}(\{0:|Z|\})}(J)$$

$$\delta_{\theta^{-1}(\{1:|Z_p|\})}(B) \times \hat{w}_b(B)w^{(\xi)}(J)[\eta_Z^{(\xi,\theta)}]^J\left[\frac{p_b(z_{\overline{p},\vartheta(\cdot)})}{\kappa_c(z_{\overline{p},\vartheta(\cdot)})}\right]^B.$$

Going back to the Bayes update numerator term (Eq. 19) and substituting Equation (21), Finally, using Equations (22) and (23) and applying Bayes' rule, the posterior multitarget density is obtained as $$\pi(X|Z) = \frac{g(Z|X)\pi_p(X_p)\pi_b(X_b)}{\int g(Z|X)\pi_p(X_p)\pi_b(X_b)\delta X}$$

$$= \Delta(X_p)\Delta(X_b)\sum_{\xi \in \Xi}\sum_{\theta \in \Theta}\sum_{\vartheta \in \hat{V}}w_Z^{(\xi,\theta,\vartheta)}$$

$$(\mathcal{L}(X))[p^{(\xi,\theta,\vartheta)}(\cdot|Z)]^X.$$

If the single-target measurement likelihood function is linear-Gaussian, such that $$g(z|x,l)=g(z|x)=\mathcal{N}(z;Hx,R),$$

and the birth target spatial density $p_b(x,l)=p_b(x)=u_x(x) \triangleq 1/V_x$, then the measurement-marginal target birth density (Eq. 21) is $$p_b(z) \approx \triangleq(z)\mathcal{U}_{\mathbb{Z}} 1/V_{\mathbb{Z}}$$

for sufficiently small R, where $V\mathbb{X}$ and $V\mathbb{Z}$ are the "scene volumes" in the single-target kinematic space and single-target measurement space, respectively. Furthermore, if the entire single-target state space is measurable and the observation function is one-to-one, Equation (18) can be approximated by $$p_b^{(\vartheta)}(x,l|Z)=\mathcal{N}(x;H^{-1}z_{\overline{p},\vartheta(l)},H^{-1}RH^{-T}).$$

In many linear tracking problems, only part of the state is directly observed by a single measurement. Denote the observed portion of that state by $\tilde{x}$ and the non-observed portion by $\overline{x}$ such that $x^T=[\tilde{x}^T,\overline{x}^T]$. Denote by $\tilde{H}$ the nonsingular reduced observation matrix, such that $g(z|x)=g(z|\tilde{x})=\mathcal{N}(z;\tilde{H}\tilde{x},R)$. The density $p_b(\overline{x},l)$ of the unobservable portion of the state is the marginal $\int p_b([\tilde{x}^T,\overline{x}^T]T,l)d\tilde{x}$. The measurement-conditioned single-target birth density is then $$p_b^{(\vartheta)}(x,\ell|Z) = \begin{bmatrix}\mathcal{N}(\tilde{x};\tilde{H}^{-1}z_{\overline{p},\vartheta(\ell)},\tilde{H}^{-1}R\tilde{H}^{-T})\\ pb(x,\ell)\end{bmatrix}.$$

In the prediction stage, the posterior density undergoes a time-update to produce the density at time k+1, which is denoted by $\pi_+(X_+)$. The posterior density is propagated forward in time according to the multitarget Chapman-Kolmogorov equation $$\pi_+(X_+) = \int f(X_+|X)\pi(X)\delta X. \tag{24}$$

The transition density $f(X_+|X)$ describes both target survival and kinematic state evolution. Each target either survives with probability $p_s(x,l)$ or dies with probability $q_s(x,l)=1-p_s(x,l)$. A surviving target state evolves probabilistically to a new state $(x_+,l_+)$ according to the single-target transition density $f(x_+|x,l)\delta_l(l_+)$. The multitarget transition density can be written in GLMB form as $$f(X_+|X) = \Delta(X_+)\Delta(X)1_{\mathcal{L}(X)}(\mathcal{L}(X_+))[\Phi(X_+;\cdot)]^T, \tag{25}$$

where $$\Phi(X_+;x,\ell) \triangleq \sum_{(x_+,\ell_+)\in X_+} \delta_\ell(\ell_+)p_S(x,\ell)f(x_+|x,\ell) + [1 - 1_{\mathcal{L}(X_+)}(\ell)]q_S(x,\ell).$$

In Equation (25), the term $1\mathcal{L}(\mathcal{L}(X_+))$ ensures that the new multitarget label set contains no labels not present in $\mathcal{L}(X)$.

Given a posterior GLMB density of the form of Equation (1) and multitarget transition density given by Equation (25), the predicted density is also a GLMB density given by $$\pi_+(X_+) = \Delta(X_+)\sum_{\xi\in\Xi} w_S^{(\xi)}(\mathcal{L}(X_+))\left[p_S^{(\xi)}\right]^{X_+},$$

where $$w_S^{(\xi)}(I) \triangleq \left[\eta_S^{(\xi)}\right]^I \sum_{J\in\mathcal{F}(\mathbb{L})} 1_J(I)\left[q_S^{(\xi)}\right]^{J-I} w^{(\xi)}(J),$$

$$\eta_S^{(\xi)}(\ell) \triangleq \int \langle p_S(\cdot,\ell)f(x|\cdot,\ell), p^{(\xi)}(\cdot,\ell)\rangle dx,$$

$$q_S^{(\xi)} \triangleq \langle q_S(\cdot,\ell), p^{(\xi)}(\cdot,\ell)\rangle, \text{ and}$$

$$p_S^{(\xi)}(x,\ell) \triangleq \frac{\langle p_S(\cdot,\ell)f(x|\cdot,\ell), p^{(\xi)}(\cdot,\ell)\rangle}{\eta_S^{(\xi)}(\ell)}.$$

Substituting Equation (25) into Equation (24), $$\pi_+(X_+) = \Delta(X_+)\sum_{\xi\in\Xi}\int \Delta(X)1_{\mathcal{L}(X)}(\mathcal{L}(X_+))w^{(\xi)}(\mathcal{L}(X))[\Phi(X_+;\cdot)p^{(\xi)}]^X \delta X \tag{26}$$

$$= \Delta(X_+)\sum_{\xi\in\Xi}\sum_{I\in\mathcal{F}(\mathbb{L})} 1_I(\mathcal{L}(X_+))w^{(\xi)}(I)\prod_{\ell\in I} \langle \Phi(X_+;\cdot,\ell), p^{(\xi)}(\cdot,\ell)\rangle.$$

The product in Equation (26) can be separated into two products over persistent target labels and non-surviving (death) target labels as $$\prod_{\ell\in I} \langle \Phi(X_+;\cdot,\ell), p^{(\xi)}(\cdot,\ell)\rangle = \tag{27}$$

$$\prod_{\ell\in\mathcal{L}(X_+)} \langle \Phi(X_+;\cdot,\ell), p^{(\xi)}(\cdot,\ell)\rangle \prod_{\ell\in I-\mathcal{L}(X_+)} \langle \Phi(X_+;\cdot,\ell), p^{(\xi)}(\cdot,\ell)\rangle =$$

$$\prod_{\ell\in\mathcal{L}(X_+)}\sum_{(x_+,\ell_+)\in X_+} \delta_\ell(\ell_+)\langle p_S(\cdot,\ell)f(x_+|\cdot,\ell), p^{(\xi)}(\cdot,\ell)\rangle$$

$$\prod_{\ell\in I-\mathcal{L}(X_+)} \langle q_S(\cdot,\ell), p^{(\xi)}(\cdot,\ell)\rangle =$$

$$\prod_{\ell\in\mathcal{L}(X_+)}\sum_{(x_+,\ell_+)\in X_+} \delta_\ell(\ell_+)p_S^{(\xi)}(x_+,\ell)\eta_S^{(\xi)}(\ell) \prod_{\ell\in I-\mathcal{L}(X_+)} q_S^{(\xi)}(\ell),$$

Because the sum in Equation (27) has only one nonzero term (when $l=l_+$), it can be combined with the product so that $$\prod_{\ell\in I} \langle \Phi(X_+;\cdot,\ell), p^{(\xi)}(\cdot,\ell)\rangle = \prod_{(x_+,\ell_+)\in X_+} p_S^{(\xi)}(x_+,\ell)\eta_S^{(\xi)}(\ell)\prod_{\ell\in I-\mathcal{L}(X_+)} q_S^{(\xi)}(\ell) =$$

$$\left[p_S^{(\xi)}\right]^{X_+}\left[\eta_S^{(\xi)}\right]^{\mathcal{L}(X_+)}\left[q_S^{(\xi)}\right]^{I-\mathcal{L}(X_+)}.$$

This simplified expression can be substituted into Equation (26) to produce the final time-update equation as $$\pi_+(X_+) = \Delta(X_+)\sum_{\xi\in\Xi}\sum_{I\in\mathcal{F}(\mathbb{L})} 1_I(\mathcal{L}(X_+))w^{(\xi)}(I)\left[p_S^{(\xi)}\right]^{X_+}\left[\eta_S^{(\xi)}\right]^{\mathcal{L}(X_+)}\left[q_S^{(\xi)}\right]^{I-\mathcal{L}(X_+)}$$

$$= \Delta(X_+)\sum_{\xi\in\Xi} w_S^{(\xi)}(\mathcal{L}(X_+))\left[p_S^{(\xi)}\right]^{X_+}.$$

For more straightforward implementation, the data-driven GLMB can be written in delta-generalized form, which simply makes use of the identity $$w^{(\xi)}(J) = \sum_{I\in\mathcal{F}(\mathbb{L})} w^{(\xi)}(I)\delta_I(J).$$

With this, a standard GLMB distribution can be written as a delta-GLMB as $$\pi(X) = \Delta(X)\sum_{(I,\xi)\in\mathcal{F}(\mathbb{L})\times\Xi} \omega^{(I,\xi)}\delta_I(\mathcal{L}(X))[p^{(\xi)}]^X,$$

where $\omega^{(I,\xi)} \triangleq w^{(\xi)}(I)$.

Given a prior delta-GLMB of the form $$\pi(X) = \Delta(X)\sum_{(I,\xi)\in\mathcal{F}(\mathbb{L})\times\Xi} \omega^{(I,\xi)}\delta_I(\mathcal{L}(X))[p^{(\xi)}]^X,$$

the measurement-updated posterior is $$\pi(X\mid Z) = \Delta(X) \sum_{(I,\xi)\in\mathcal{F}(\mathbb{L})\times\Xi} \sum_{\theta\in\Theta} \sum_{\vartheta\in\hat{V}} \omega^{(I,\xi,\theta,\vartheta)}(Z)\delta_I(\mathcal{L}(X))[p^{(\xi,\theta,\vartheta)}(\cdot\mid Z)]^X,$$

where $\omega^{(I,\xi,\theta,\vartheta)}(Z) \triangleq w_Z^{(\xi,\theta\vartheta)}(I)$.

Given a posterior delta-GLMB density of the form $$\pi(X) = \Delta(X) \sum_{(I,\xi)\in\mathcal{F}(\mathbb{L})\times\Xi} \omega^{(I,\xi)}\delta_I(\mathcal{L}(X))[p^{(\xi)}]^X,$$

the time-updated prior is $$\pi_+(X_+) = \Delta(X_+) \sum_{(I,\xi)\in\mathcal{F}(\mathbb{L})\times\Xi} \omega_S^{(I,\xi)}\delta_I(\mathcal{L}(X_+))\left[p_S^{(\xi)}\right]^{X_+},$$

Where $\omega_S^{(I,\vartheta)} \triangleq w_S^{(\vartheta)}(I)$.

To evaluate the performance of a data-driven delta-GLMB tracker in accordance with an illustrative embodiment, a first simulation was performed with numerous target births. The single-target state $x_k=[r_{x,k}, r_{y,k}, \dot{r}_{x,k}, \dot{r}_{y,k}]^T$ consisted of the Cartesian position and velocity of the target. The true number of births at every time step was sampled from a Poisson distribution with mean $\lambda_b=2.0$. The birth targets' true initial positional states were sampled uniformly over the scene, and the true initial velocities were sampled from a zero-mean Gaussian distribution with standard deviation $\sigma_r=0.05$ [m/s]. The simulation began with three true targets and concluded with 28, with 30 true targets in total (two target deaths).

Figure 5:
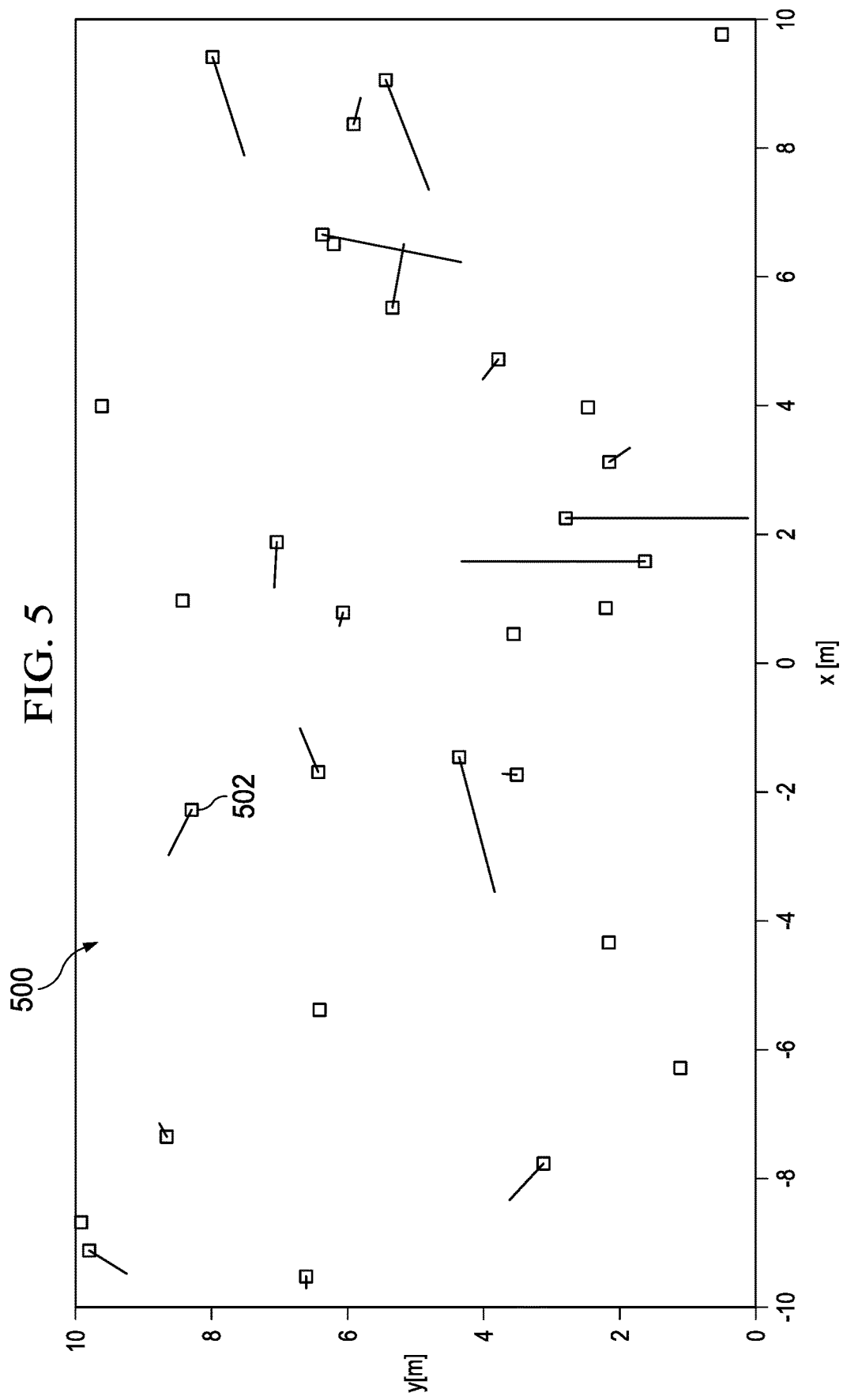
FIG. 5 is an illustration of simulated motion of targets in a first simulation.

Turning to FIG. 5 an illustration of simulated motion of targets in a first simulation is depicted. True paths 500 of all thirty targets in the simulation are shown. The starting location of each target is represented by square marker 502.

Figure 6:
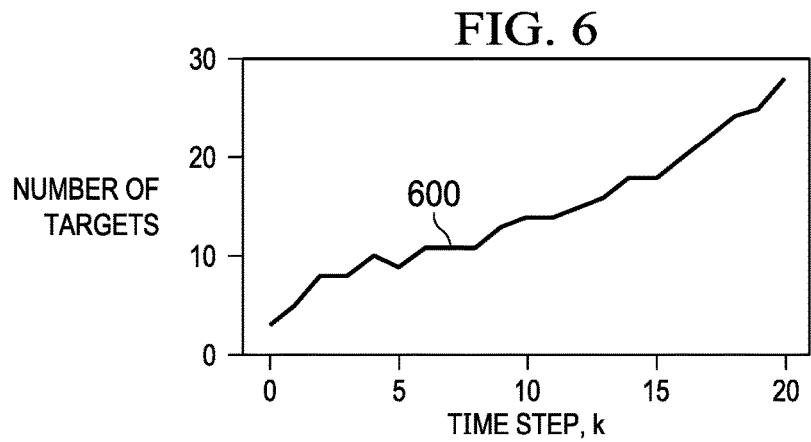
FIG. 6 is an illustration of cardinality over time for the simulated targets in FIG. 5.

Turning to FIG. 6, an illustration of cardinality over time for the simulated targets in FIG. 5 is depicted. Line 600 shows the true number of targets in the simulation at each time step.

Figure 7:
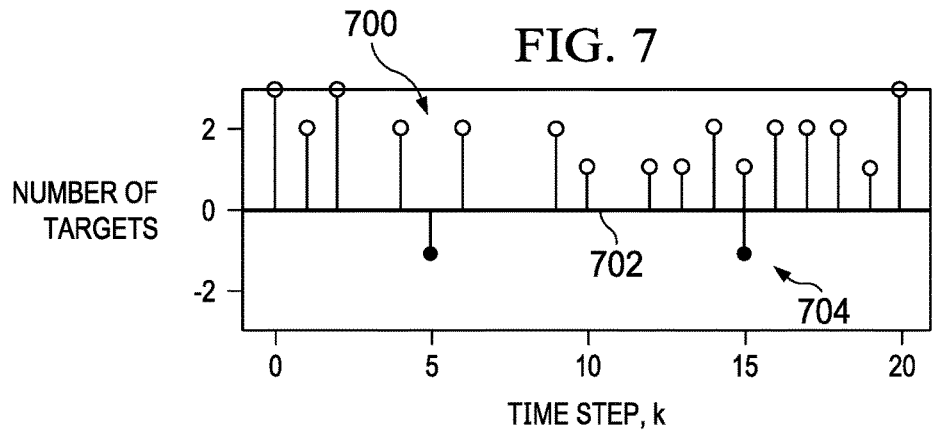
FIG. 7 is an illustration of births and deaths over time of the simulated targets in FIG. 5.

Turning to FIG. 7, an illustration of births and deaths over time of the simulated targets in FIG. 5 id depicted. Stems 700 extending above line 702 indicate the true number of births of targets in a time step of the simulation. Stems 704 extending below line 702 indicate the true number of deaths of targets in a time step of the simulation.

Target motion was propagated via a constant-velocity model given as $$x_{k+1} = F_k x_k + M_k \eta_k,$$

Where $\eta_k$ is a 2×1 Gaussian white noise vector with $E\{\eta_k \eta_k^T\} = Q_k$, $$F_k = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix}, \text{ and } M_k = \begin{bmatrix} \frac{1}{2}\Delta t^2 & 0 \\ 0 & \frac{1}{2}\Delta t^2 \\ \Delta t & 0 \\ 0 & \Delta t \end{bmatrix}.$$

The process noise matrix was taken to be $Q_k=\text{diag}\{[10^{-5}\ 10^{-5}]\}$. Measurements in the form of Cartesian position coordinates were generated from the targets at 1 [Hz] with a constant probability of detection of $p_D=0.75$. If detected, measurements were corrupted with zero-mean additive Gaussian noise with standard deviation $\sigma_{x,y}=0.1$ [m]. Clutter was generated as a Poisson RFS with intensity $K_c(z)=\lambda_c \mathcal{U}_z(z)$, where $\lambda_c=3.0$.

To study the efficacy of the data-driven delta-GLMB tracker in accordance with an illustrative embodiment, its performance was compared to the original delta-GLMB filter with an adaptive LMB birth process. The computational complexity of each filter was controlled through the maximum allowed number of hypotheses, which was chosen as $J_{max}=500$. The adaptive LMB implementation additionally required specification of a maximum birth target weight, which was chosen as $r_B=0.75$. A total of 500 Monte Carlo simulations were run, in which detectability, measurement noise, and clutter were randomly sampled. Target trajectories and times of birth were held constant across the runs. At each time step, state estimates were extracted from the multitarget posterior density using a suboptimal version of the so-called "Marginal Multi-object Estimator". Using the positional components of the state estimates and the true target positions, the first-order optimal subpattern assignment (OSPA) metric was computed with cutoff distance $c=0.5$[m] and averaged over the 500 runs.

Figure 8:
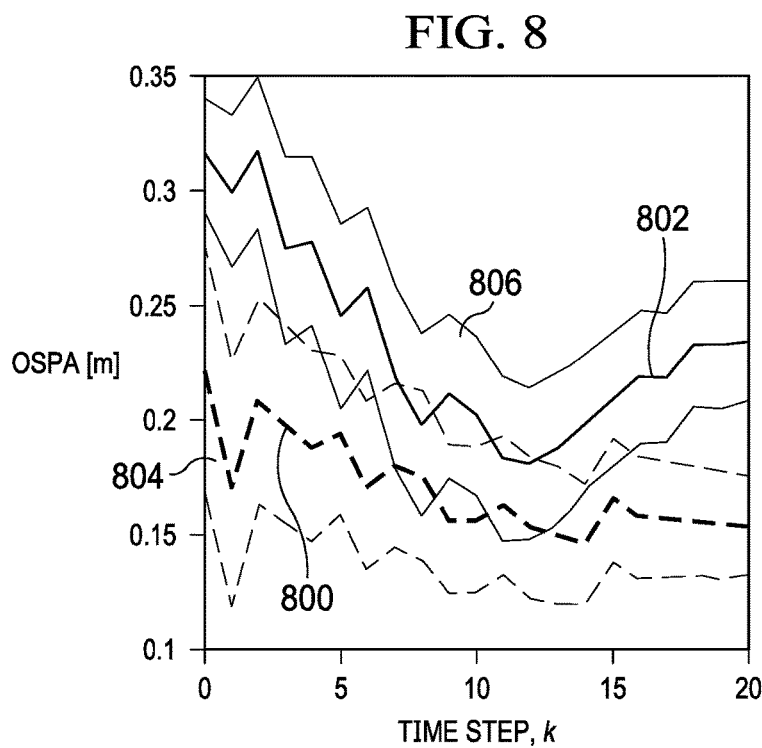
FIG. 8 is an illustration of a first-order optimal sub-pattern assignment metric for a data-driven delta-GLMB tracker in accordance with an illustrative embodiment and a prior art tracking method applied to the simulated targets of FIG. 5.

Turning to FIG. 8, an illustration of a first-order optimal sub-pattern assignment metric for a data-driven delta-GLMB tracker in accordance with an illustrative embodiment and a prior art tracking method applied to the simulated objects of FIG. 5 is depicted. An average first-order optimal subpattern assignment metric over 500 trials for a data-driven delta-GLMB tracker in accordance with an illustrative embodiment is shown by line 800. An average first-order optimal subpattern assignment metric over 500 trials for the original delta-GLMB filter with an adaptive LMB birth process is shown by line 802. The standard deviation of the metric over the 500 trials was computed. Shaded regions 804 and 806 indicate positive and negative deviations of the standard deviation from the average.

On average, lower OSPA values, and thus, higher accuracy estimates, are produced by the data-driven approach at every time step. Furthermore, the average estimation error of the data-driven filter trends downward over the simulation period, despite the steadily increasing number of targets, whereas the average estimation error given by the adaptive LMB approach trends upward after k=12. The true total cardinality and birth/death cardinality reveal a correlation between the estimation performance and changes in target cardinality. Specifically, in the case of the adaptive LMB approach, all of the instances of significant accuracy improvement, in the form of drops in OSPA, coincided with instances when no targets were born, namely k=3, 5, 7, 8, and 11. To some extent, this correlation is expected, due the adaptive LMB method's inherent deferred birth initialization.

A second simulation was used to evaluate the performance of a data-driven delta-GLMB tracker in accordance with an illustrative embodiment. The second simulation was similar to the first, except the simulation time, clutter rate, and measurement noise were increased. Measurements are corrupted with zero-mean additive Gaussian noise with standard deviation $\sigma_{x,y}=0.25$ [m]. Clutter was generated as a Poisson RFS with intensity $k_c(z)=\lambda_c U_z(z)$, where $\lambda_c=5.0$. The simulation began with three true targets and concluded with 102 true targets, with 116 true targets in total (14 target deaths).

Figure 9:
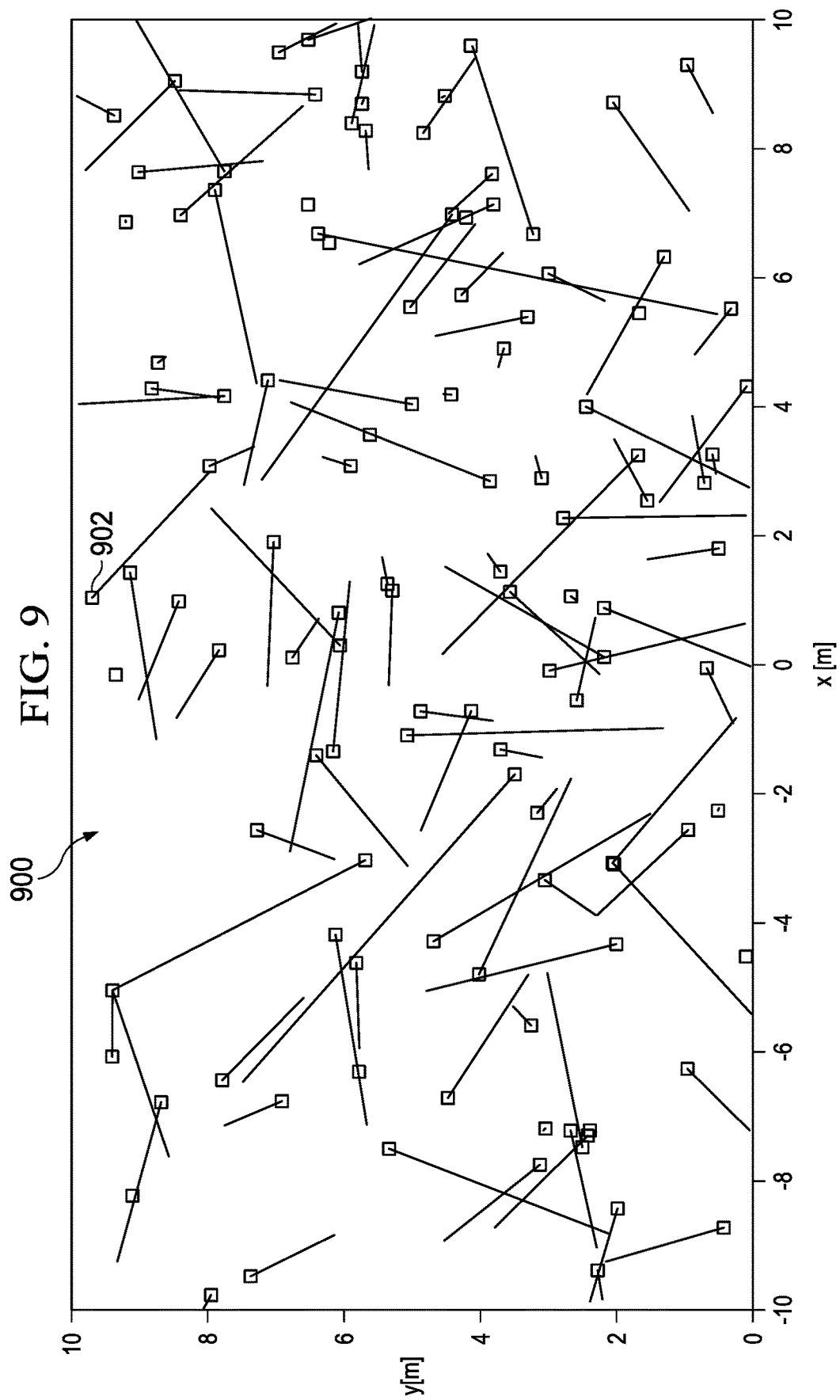
FIG. 9 is an illustration of simulated motion of targets in a second simulation.

Turning to FIG. 9, an illustration of simulated motion of targets in the second simulation is depicted. True paths 900 or all 116 targets in the simulation are shown. The starting location of each target is represented by square marker 902.

Figure 10:
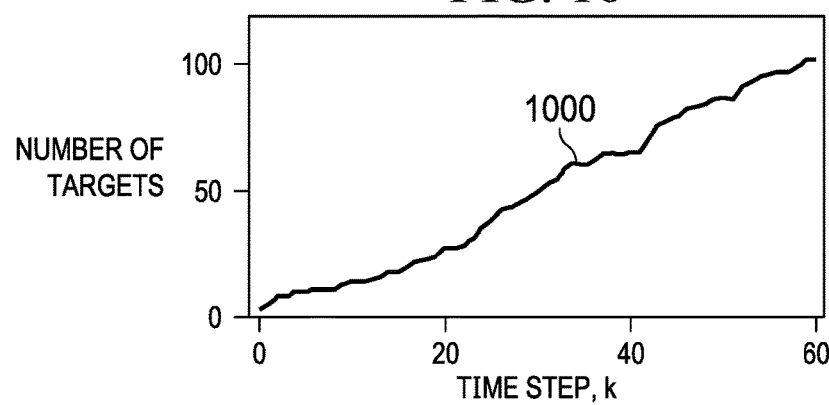
FIG. 10 is an illustration of cardinality over time for the simulated targets in FIG. 9.

Turning to FIG. 10, an illustration of cardinality over time for the simulated targets in FIG. 9 is depicted. Line 1000 shows the true number of targets in the simulation at each time step.

Figure 11:
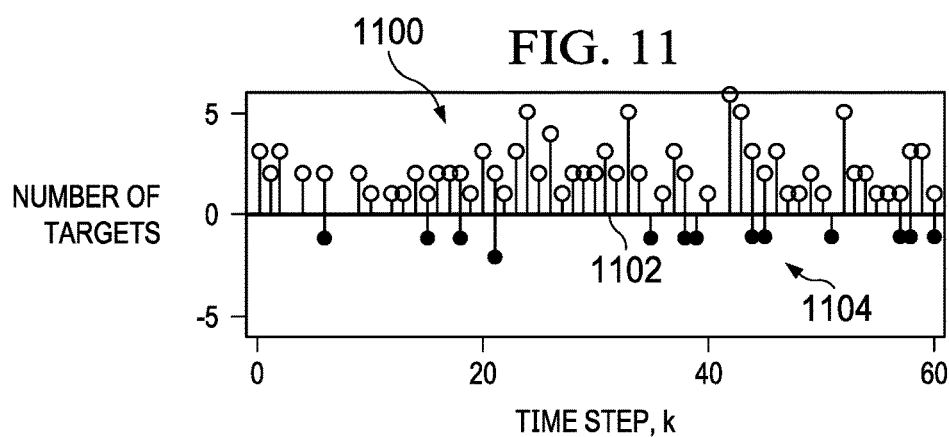
FIG. 11 is an illustration of births and deaths over time of the simulated targets in FIG. 9.

Turning to FIG. 11, an illustration of births and deaths over time of the simulated targets in FIG. 9 id depicted. Stems 1100 extending above line 1102 indicate the true number of births of targets in a time step of the simulation. Stems 1104 extending below line 1102 indicate the true number of deaths of targets in a time step of the simulation.

Figure 12:
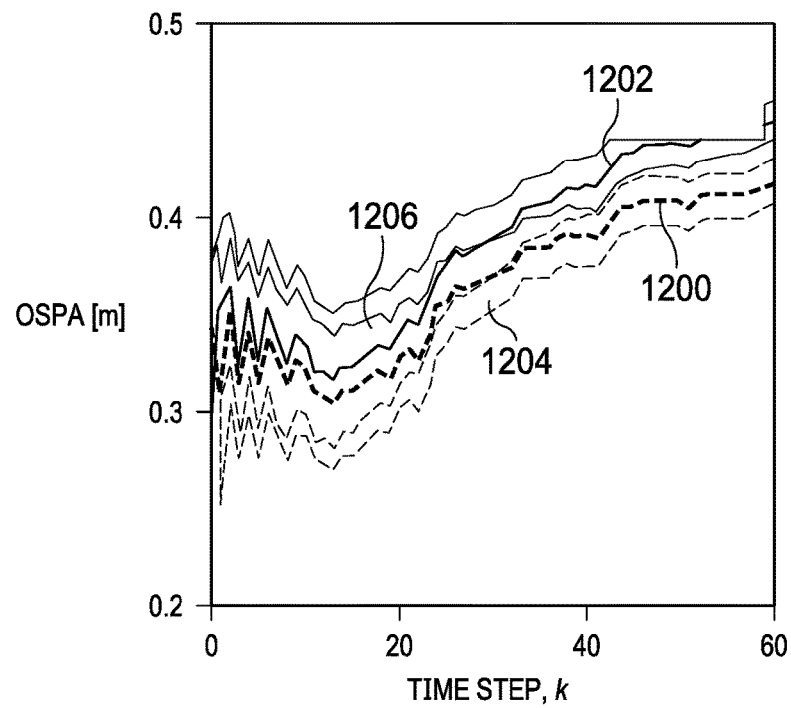
FIG. 12 is an illustration of a first-order optimal subpattern assignment metric for a data-driven delta-GLMB tracker in accordance with an illustrative embodiment and a prior art tracking method applied to the simulated targets of FIG. 9.

Turning to FIG. 12, an illustration of a first-order optimal sub-pattern assignment metric for a data-driven delta-GLMB tracker in accordance with an illustrative embodiment and a prior art tracking method applied to the simulated targets of FIG. 9 is depicted. In each of 500 Monte Carlo trials, detectability, measurement noise, and clutter were randomly sampled while the target trajectories and times of birth were held constant. An average first-order optimal sup pattern assignment metric over the 500 trials for a data-driven delta-GLMB tracker in accordance with an illustrative embodiment is shown by line 1200. An average first-order optimal subpattern assignment metric over the 500 trials for the original delta-GLMB filter with an adaptive LMB birth process is shown by line 1202. The standard deviation of the metric over the 500 trials was computed. Shaded regions 1204 and 1206 indicate positive and negative deviations of the standard deviation from the average.

In terms of the OSPA multitarget miss distance, the data-driven delta-GLMB tracker in accordance with an illustrative embodiment produced, on average, higher accuracy multitarget estimates at every time step. Trial-averaged OSPA results may be interpreted as a broad indication of filter importance, as relative performance could vary by trial. In this example, the performance of both filters degraded significantly over time, as indicated by the rising OSPA values, which trend toward the cutoff distance c=0.5 [m].

Figure 13:
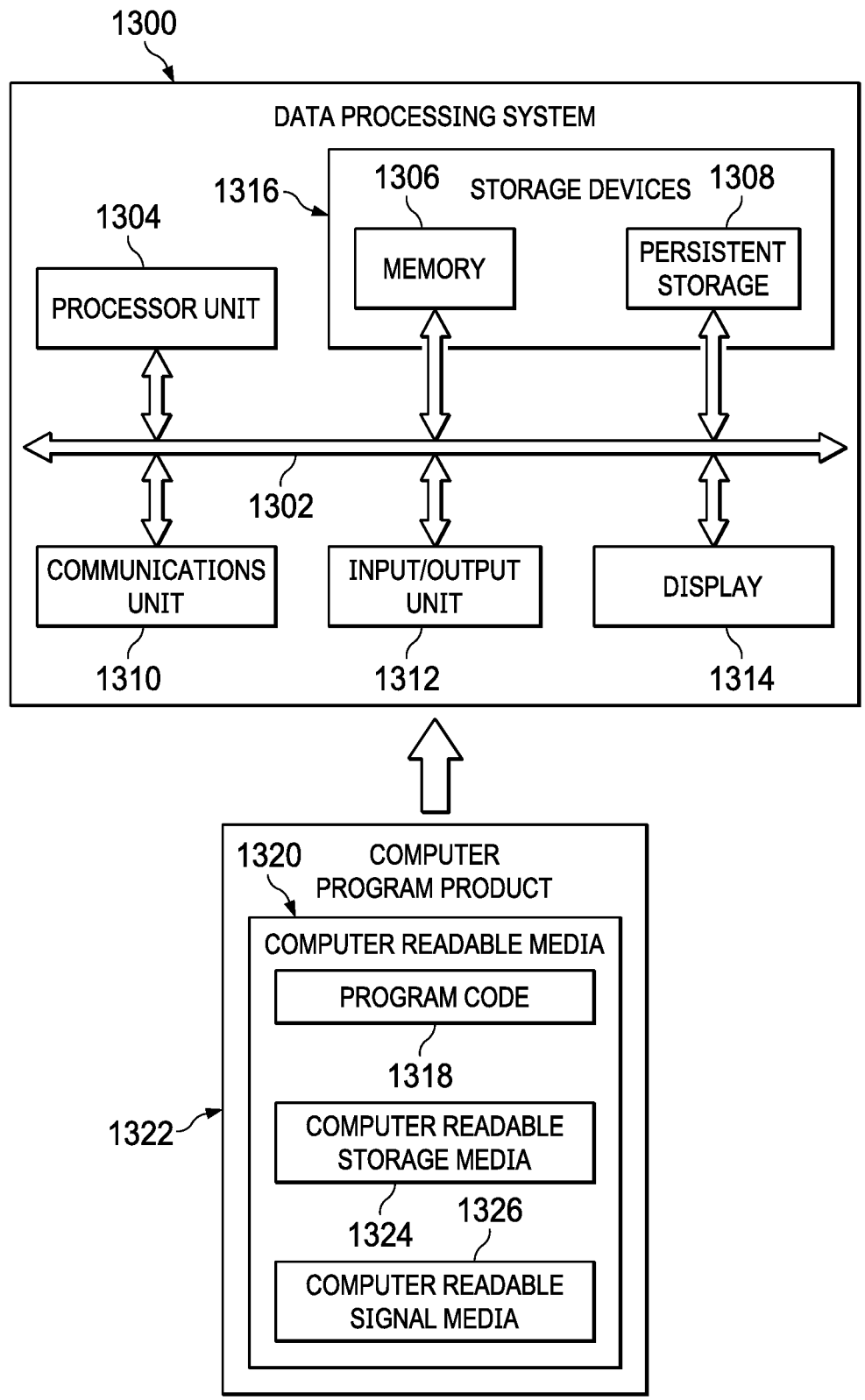
FIG. 13 is an illustration of a block diagram of a data processing system in accordance with an illustrative embodiment.

Turning to FIG. 13, an illustration of a block diagram of a data processing system is depicted in accordance with an illustrative embodiment. Data processing system 1300 is an example of one possible implementation of a data processing system for performing functions of a tracking, system in accordance with an illustrative embodiment. For example, without limitation, data processing system 1300 is an example of one possible implementation of a data processing system for implementing tracking system 100 in FIG. 1.

In this illustrative example, data processing system 1300 includes communications fabric 1302. Communications fabric 1302 provides communications between processor unit 1304, memory 1306, persistent storage 1308, communications unit 1310, input/output (I/O) unit 1312, and display 1314. Memory 1306, persistent storage 1308, communications unit 1310, input/output (I/O) unit 1312, and display 1314 are examples of resources accessible by processor unit 1304 via communications fabric 1302.

Processor unit 1304 serves to run instructions for software that may be loaded into memory 1306. Processor unit 1304 may be a number of processors, a multi-processor core, or some other type of processor, depending on the particular implementation. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and other suitable information either on a temporary basis or a permanent basis. Storage devices 1316 also may be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output (I/O) unit 1312 allows for input and output of data with other devices that may be connected to data processing system 1300. For example, input/output (I/O) unit 1312 may provide a connection for user input through a keyboard, a mouse, and/or some other suitable input device. Further, input/output (I/O) unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program instructions, program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326.

Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected data processing system 1300. In some instances, computer readable storage media 1324 may not be removable from data processing system 1300.

In these examples, computer readable storage media 1324 is a physical or tangible storage device used to store program code 1318 rather than a medium that propagates or transmits program code 1318. Computer readable storage media 1324 is also referred, to as a computer readable tangible storage device or a computer readable physical storage device. In other words, computer readable storage media 1324 is a media that can be touched, by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code. As one example, data processing system 1300 may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted, because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system.

Additionally, communications unit 1310 may include a number of devices that transmit data, receive data, or both transmit and receive data. Communications unit 1310 may be, for example, a modem or a network adapter, two network adapters, or some combination thereof. Further, a memory may be, for example, memory 1306, or a cache, such as that found in an interface and memory controller hub that may be present in communications fabric 1302.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has bees presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of tracking a plurality of objects, comprising:
   receiving unlabeled measurement data identifying a plurality of targets corresponding to the plurality of objects;
   generating a multi-target likelihood function using a persistent target density, a birth target density, and a clutter density;
   using the multi-target likelihood function to identify persistent targets in the plurality of targets in the measurement data to associate the persistent targets with persistent tracks for the plurality of objects to update the persistent tracks and to identify birth targets in the plurality of targets in the measurement data that are not associated with the persistent tracks to initiate a new track for each birth target.

2. The method of claim 1, wherein each measurement in the unlabeled measurement data that is not associated with a persistent target or clutter generates a birth target track in a first time step and further comprising making each birth target in the first time step into a persistent target for a second time step.

3. The method of claim 1, wherein the persistent target density and the multi-target likelihood function are for a first time step, and further comprising:
generating a joint posterior density from the persistent target density, the birth target density, and the multi-target likelihood function;
performing a time-update on the joint posterior density to generate a predicted density for a second time step; and
changing variables to make the predicted density for the second time step into a persistent target density for the second time step.

4. The method of claim 3, wherein generating the joint posterior density comprises generating the joint posterior density through the Bayes update.

5. The method of claim 3, wherein performing the time-update on the joint posterior density comprises propagating the joint posterior density forward in time according to a multi-target Chapman-Kolmogorov equation.

6. The method of claim 1 further comprising displaying the persistent tracks and the new tracks.

7. The method of claim 1, wherein the plurality of objects are selected from a plurality of objects in space, a plurality of objects on the ground, a plurality of objects in the air, or a plurality of objects under water.

8. The method of claim 1, further comprising:
receiving sensor data, wherein the sensor data comprises video images of the plurality of objects in a scene; and
identifying the images of the plurality of objects in the sensor data as the targets to generate the measurement data.

9. An apparatus, comprising:
a data processing system configured to receive unlabeled measurement data identifying a plurality of targets corresponding to a plurality of objects; and
a data-driven delta-GLMB tracker implemented in the data processing system and configured to:
generate a multi-target likelihood function using a persistent target density, a birth target density, and a clutter density;
use the multi-target likelihood function to identify persistent targets in the plurality of targets in the measurement data to associate the persistent targets with persistent tracks for the plurality of objects to update the persistent tracks and to identify birth targets in the plurality of targets in the measurement data that are not associated with the persistent tracks to initiate a new track for each birth target.

10. The apparatus of claim 9, wherein each measurement in the unlabeled measurement data that is not associated with a persistent target or clutter generates a birth target track in a first time step and wherein the data-driven delta-GLMB tracker is further configured to make each birth target in the first time step into a persistent target for a second time step.

11. The apparatus of claim 9, wherein the persistent target density and the multi-target likelihood function are for a first time step, and wherein the data-driven delta-GLMB tracker is further configured to:
generate a joint posterior density from the persistent target density, the birth target density, and the multi-target likelihood function;
perform a time-update on the joint posterior density to generate a predicted density for a second time step; and
change variables to make the predicted density for the second time step into a persistent target density for the second time step.

12. The apparatus of claim 11, wherein the data-driven delta-GLMB tracker is configured to generate the joint posterior density through the Bayes update.

13. The apparatus of claim 11, wherein the data-driven delta-GLMB tracker is configured to perform the time-update on the joint posterior density by propagating the joint posterior density forward in time according to a multi-target Chapman-Kolmogorov equation.

14. The apparatus of claim 9 further comprising a display generator configured to generate a track display for displaying the persistent tracks and the new tracks.

15. The apparatus of claim 9, wherein the plurality of objects are selected from a plurality of objects in space, a plurality of objects on the ground, a plurality of objects in the air, or a plurality of objects under water.

16. The apparatus of claim 9, wherein:
the receiver is configured to receiving sensor data, wherein the sensor data comprises video images of the plurality of objects in a scene; and further comprising
a target identifier configured to identify the images of the plurality of objects in the sensor data as the targets to generate the measurement data.

17. A method of identifying birth targets for tracking a plurality of objects, comprising:
receiving measurement data identifying a plurality of targets corresponding to the plurality of objects in a first time step;
generating a multi-target likelihood function using a persistent target density for the first time step, a birth target density, and a clutter density;
using the multi-target likelihood function to identify the birth targets for the first time step in the plurality of targets in the received measurement data, wherein the birth targets are targets that are not associated with already identified persistent tracks;
generating a joint posterior density from the persistent target density for the first time step, the birth target density, and the multi-target likelihood function;
performing a time-update on the joint posterior density to generate a predicted density for a second time step; and
changing variables to make the predicted density for the second time step into a persistent target density for the second time step.

18. The method of claim 17, further comprising:
using the multi-target likelihood function to identify persistent targets in the plurality of targets in the measurement data to associate the persistent targets with persistent tracks for the plurality of objects to update the persistent tracks and to initiate a new track for each birth target in the plurality of targets in the measurement data that is not associated with a persistent track.

19. The method of claim 17, wherein generating the joint posterior density comprises generating the joint posterior density through the Bayes update.

20. The method of claim 17, wherein performing the time-update on the joint posterior density comprises propagating the joint posterior density forward in time according to a multi-target Chapman-Kolmogorov equation.

* * * * *